United States Patent [19]

Yamamoto et al.

[11] Patent Number: 5,337,242
[45] Date of Patent: Aug. 9, 1994

[54] POSITION INFORMATION PROCESSING SYSTEM FOR MOBILE

[75] Inventors: Tomohiro Yamamoto, Anjo; Shigeru Iwade, Chiryu, both of Japan

[73] Assignee: Aisin Seiki Kabushiki Kaisha, Kariya, Japan

[21] Appl. No.: 760,551

[22] Filed: Sep. 16, 1991

[30] Foreign Application Priority Data

Sep. 14, 1990 [JP] Japan .................................. 2-245938

[51] Int. Cl.$^5$ ............................................ G08G 1/123
[52] U.S. Cl. ................................. 364/449; 364/443; 340/990; 340/995
[58] Field of Search ................. 364/443, 444, 449; 73/178 R; 340/988, 990, 995

[56] References Cited

U.S. PATENT DOCUMENTS

| | | | |
|---|---|---|---|
| 4,646,089 | 2/1987 | Takanabe et al. | 364/449 |
| 4,689,747 | 8/1987 | Kurose et al. | 364/449 |
| 4,761,742 | 8/1988 | Hanabusa et al. | 364/449 |
| 4,780,717 | 10/1988 | Takanabe et al. | 364/449 |
| 4,890,104 | 12/1989 | Takanabe et al. | 364/449 |
| 4,937,572 | 6/1990 | Yamada et al. | 340/990 |

*Primary Examiner*—Gary Chin
*Attorney, Agent, or Firm*—Sughrue, Mion, Zinn, Macpeak & Seas

[57] ABSTRACT

A position information processing system for a mobile includes a detecting device for detecting the current position of the mobile and a memory device for storing area information relating to a plurality of divided areas and relation information with respect to the relationship between two of the divided areas. A control device is operable in such a manner that from plural sections by which the national is divided and in which plural prefectures are included, a specific section is elected initially and the selected section is checked for plural prefectures in the order of a specific matter in order to obtain a map on a page in which the current position is included. A displaying device is provided for displaying the selected area at present by order of the control device.

3 Claims, 30 Drawing Sheets

FIG. 4a
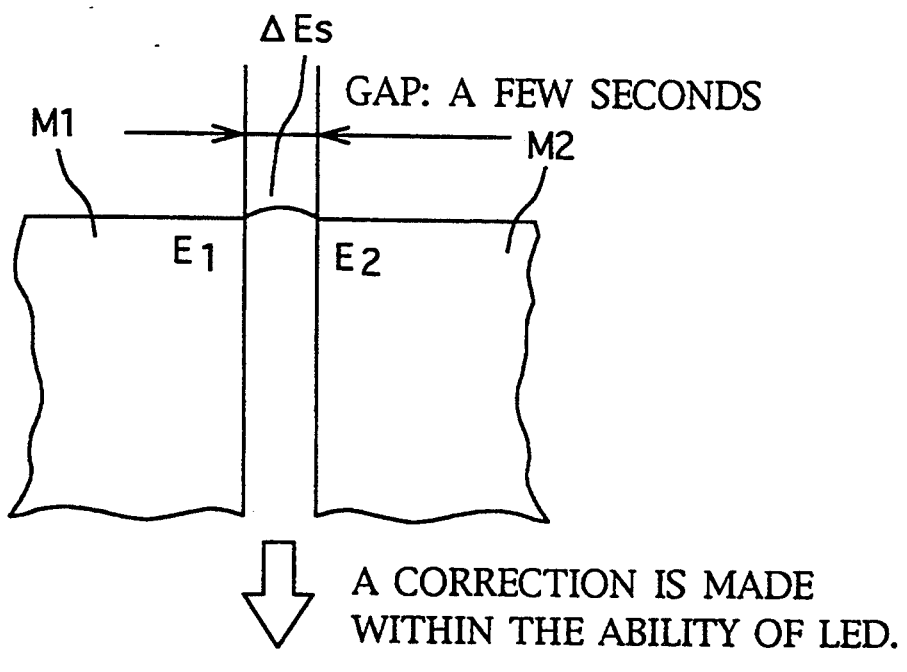
A CORRECTION IS MADE WITHIN THE ABILITY OF LED.
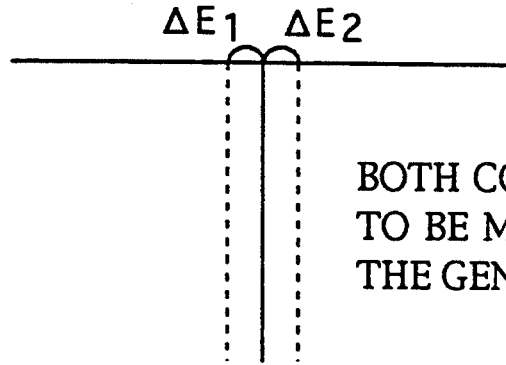
BOTH CORRECTIONS HAVE TO BE MADE FOR PREVENTING THE GENERATION OF ERRORS THEREBY.

FIG. 4b
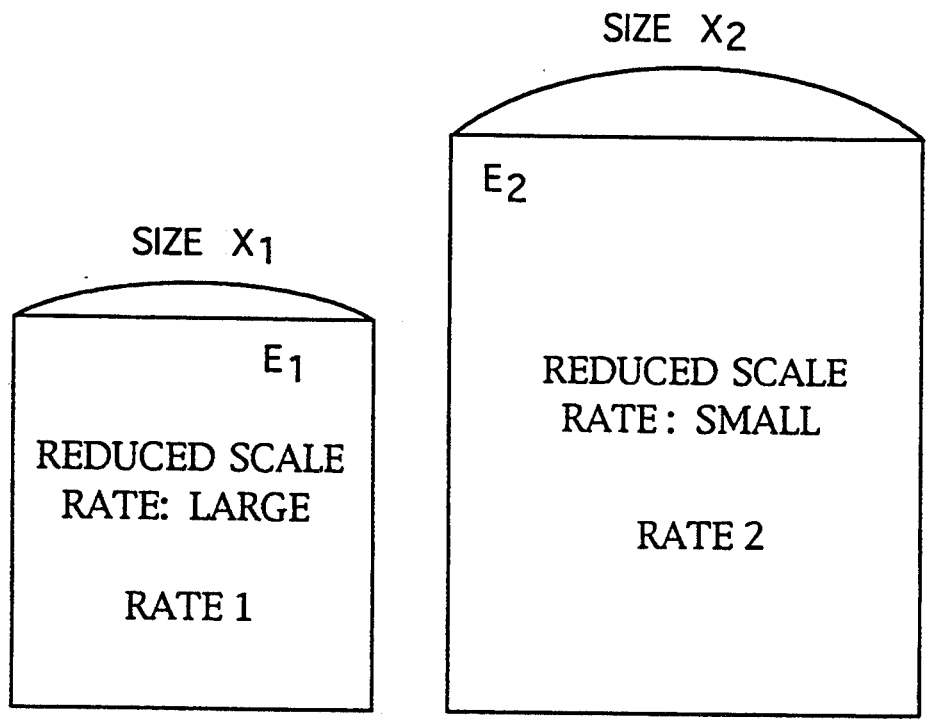
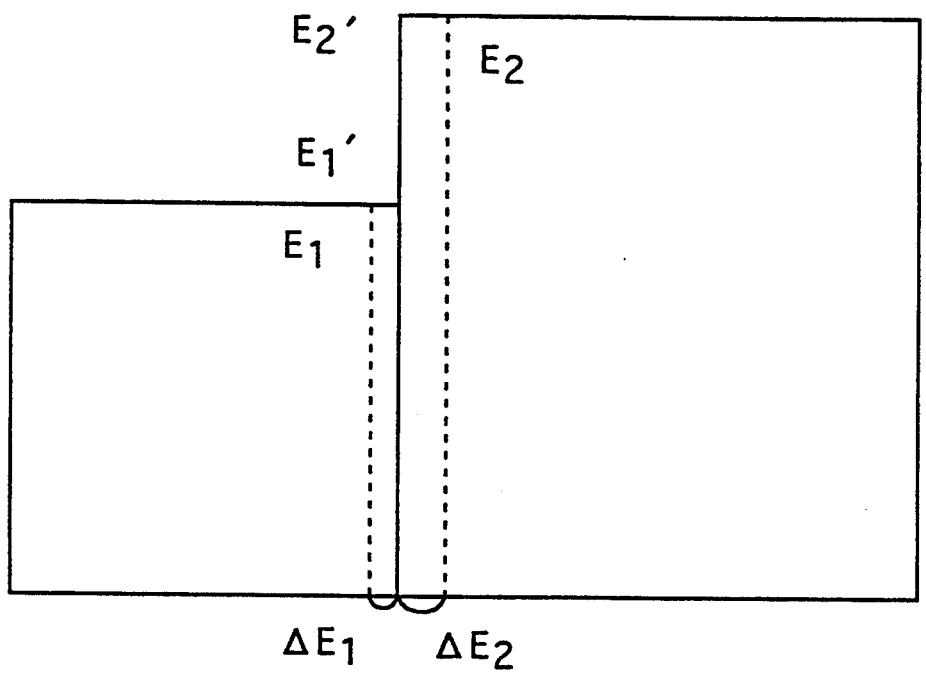

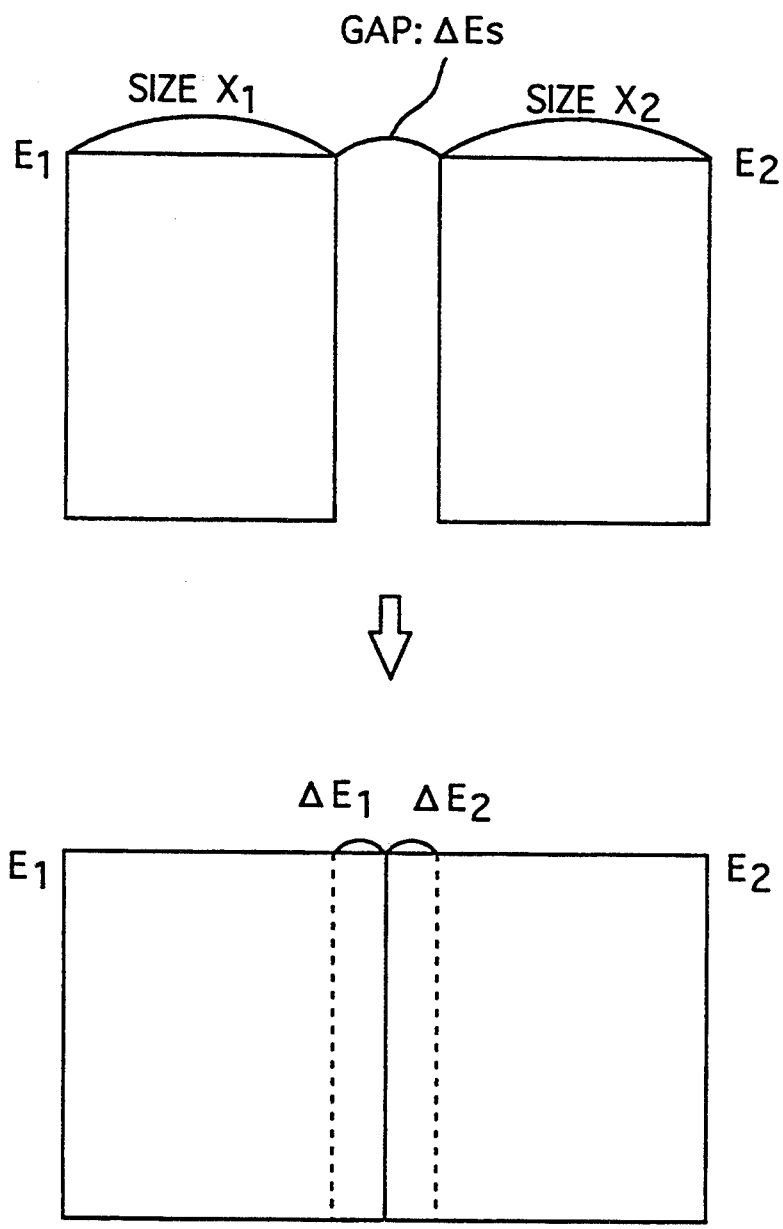

FIG. 4d
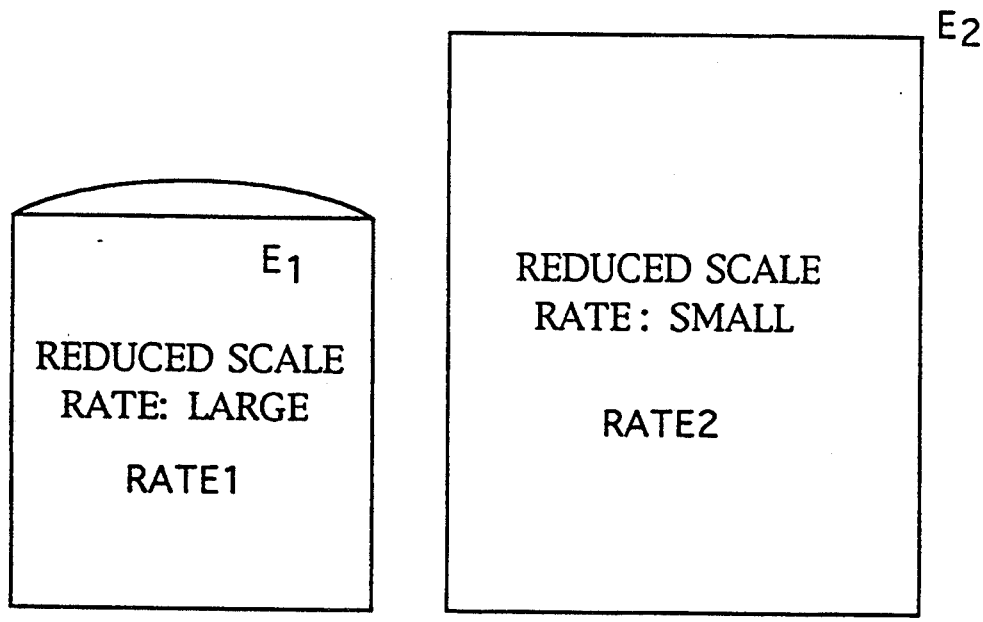
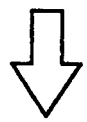
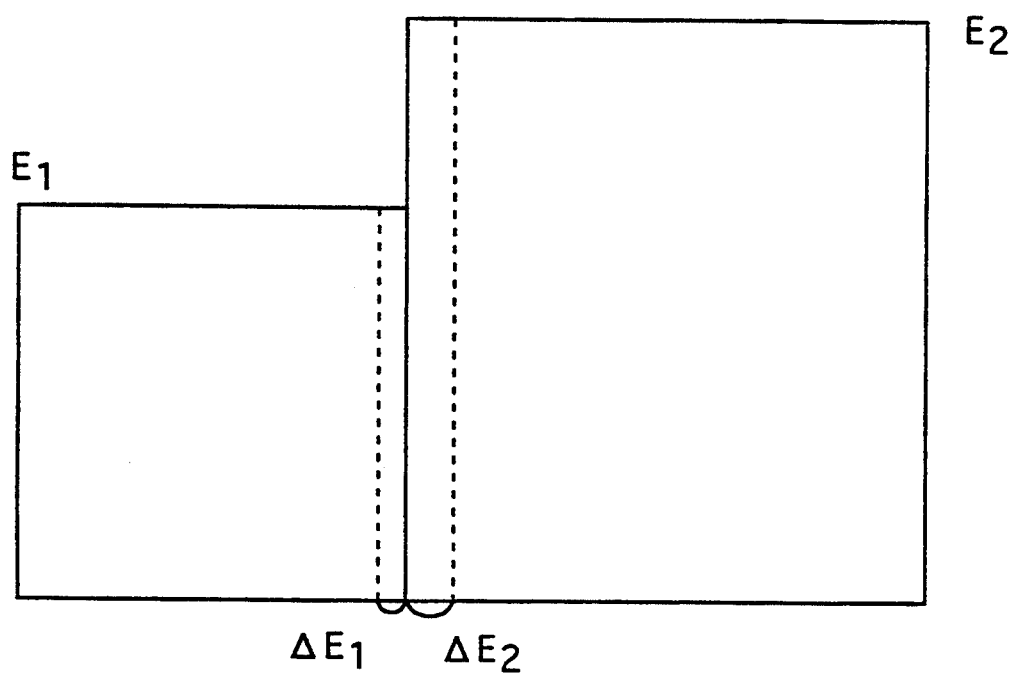

FIG. 4e
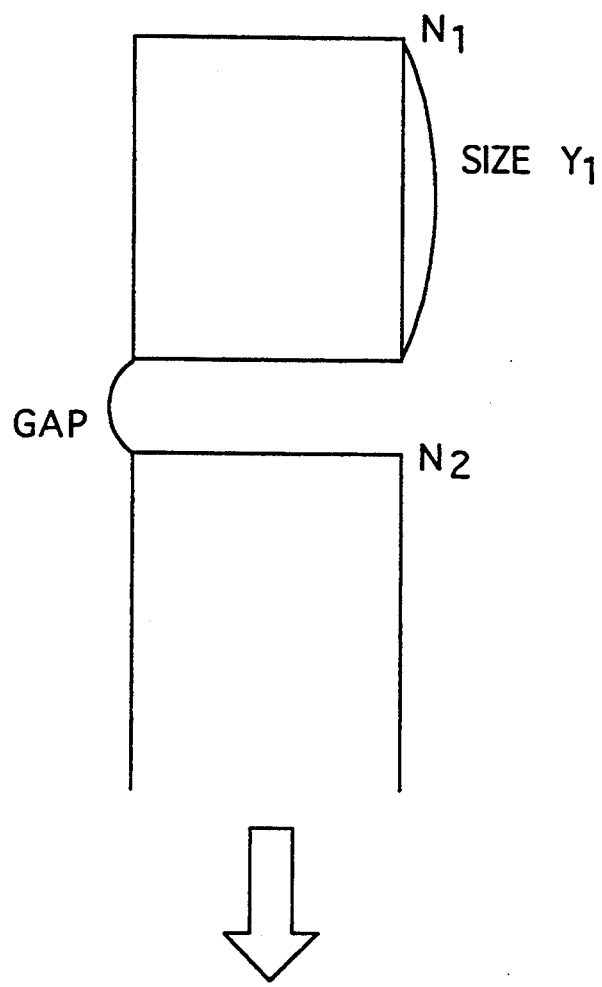
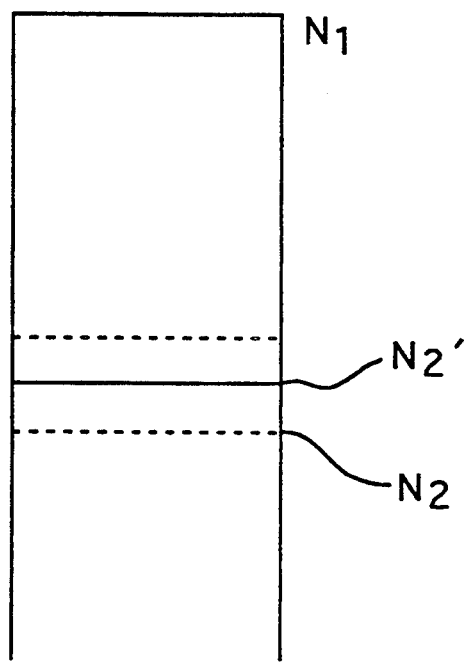

| MATRIX NO. | PRIORITY | | | | | | | |
|---|---|---|---|---|---|---|---|---|
| | 1 | 2 | 3 | 4 | 5 | 6 | 7 | 8 |
| 1 | $D_1$ | $D_2$ | | | | | | |
| 2 | $D_3$ | $D_4$ | $D_5$ | | | | | |
| 3 | $D_6$ | $D_7$ | $D_8$ | $D_9$ | $D_{10}$ | $D_{11}$ | | |
| 4 | $D_{11}$ | $D_{12}$ | | | | | | |
| 5 | $D_{13}$ | $D_{14}$ | $D_{15}$ | | | | | |
| 6 | $D_{16}$ | $D_{17}$ | | | | | | |
| 7 | $D_{18}$ | $D_{19}$ | $D_{20}$ | | | | | |

FIG. 5d

| AICHI PREFECTURE | MAP NO. | EO' | NO' | X | Y | Nn | Nt | X | Y |
|---|---|---|---|---|---|---|---|---|---|
| | 9 | 30396 | 16086 | 2648 | 1907 | 9 | 126 | 190 | 212 |

FIG. 5e

| | | | | | | | | |
|---|---|---|---|---|---|---|---|---|
| 125 | 124 | 123 | 122 | 121 | 120 | 119 | 118 | 117 |
| 116 | 115 | 114 | 113 | 112 | 111 | 110 | 109 | 108 |
| 107 | 106 | 105 | 104 | 103 | 102 | 101 | 100 | 99 |
|  |  |  |  |  |  |  |  | 90 |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  | 36 |
| 35 | 34 | 33 | 32 | 31 | 30 | 29 | 28 | 27 |
| 26 | 25 | 24 | 23 | 22 | 21 | 20 | 19 | 18 |
| 17 | 16 | 15 | 14 | 13 | 12 | 11 | 10 | 9 |
| 8 | 7 | 6 | 5 | 4 | 3 | 2 | 1 | 0 |

FIG. 6a (AICHI PREFECTURE)

| DATA NO | INDIVIDUAL MAP DATA | | | | | | ADJACENT MAP DATA | | | | | | | |
|---|---|---|---|---|---|---|---|---|---|---|---|---|---|---|
| | COORDINATES OF THE ORIGINAL POINT OF THE MAP (SECOND) | | MAP SIZE (2 SECONDS) | | OFFSET FROM THE ORIGINAL POINT | | RIGHT | UPPER RIGHT | UPPER | UPPER LEFT | LEFT | LOWER LEFT | LOWER | LOWER RIGHT |
| | LONGI-TUDE E0' | LATI-TUDE N0' | LONGI-TUDE X' | LATI-TUDE Y' | X OFF' | Y OFF' | | | | | | | | |
| ⑧1 | 30413 | 17788 | 153 | 208 | 7 | 5 | 82 | 42 | 41 | 0 | 0 | 0 | 83 | 84 |
| ⑧2 | 31172 | 17788 | 153 | 208 | 7 | 4 | 0 | 43 | 42 | 41 | 81 | 83 | 84 | 0 |
| ⑧3 | 30415 | 17369 | 153 | 208 | 7 | 5 | 84 | 82 | 81 | 0 | 0 | 0 | 85 | 86 |
| ⑧4 | 31172 | 17369 | 153 | 208 | 8 | 6 | 0 | 0 | 82 | 81 | 83 | 85 | 86 | 0 |
| ⑧5 | 30415 | 16944 | 153 | 208 | 6 | 5 | 86 | 84 | 83 | 0 | 0 | 0 | 0 | 0 |
| ⑧6 | 31170 | 16945 | 153 | 208 | 8 | 5 | 0 | 0 | 84 | 83 | 85 | 0 | 0 | 0 |
| ⑧7 | 31777 | 18787 | 153 | 208 | 7 | 4 | 88 | 101 | 99 | 99 | 0 | 0 | 91 | 92 |
| ⑧8 | 32151 | 17786 | 153 | 208 | 7 | 4 | 89 | 101 | 0 | 0 | 87 | 91 | 92 | 93 |

FIG. 6b

| PAGE | RIGHT-LEFT/REDUCED SCALE RATE | | DETAILED MAP DATA | IRREGULAR SHAPED MAP DATA | | | | | | |
|---|---|---|---|---|---|---|---|---|---|---|
| | RIGHT-LEFT | REDUCED SCALE RATE | DATA | IRREGULAR SHAPED MAP NO. | PATTERN G | a' | b' | c' | d' |
| 41 | LEFT | 1/50,000 | 178 | 0 | | | | | |
| 41 | RIGHT | 1/50,000 | 50 | 0 | | | | | |
| 42 | LEFT | 1/50,000 | 178 | 0 | | | | | |
| 42 | RIGHT | 1/50,000 | 50 | 0 | | | | | |
| 43 | LEFT | 1/50,000 | 178 | 0 | | | | | |
| 43 | RIGHT | 1/50,000 | 50 | 0 | | | | | |
| 44 | LEFT | 1/25,000 | 153 | 0 | | | | | |
| 44 | RIGHT | 1/25,000 | 25 | | | | | | |

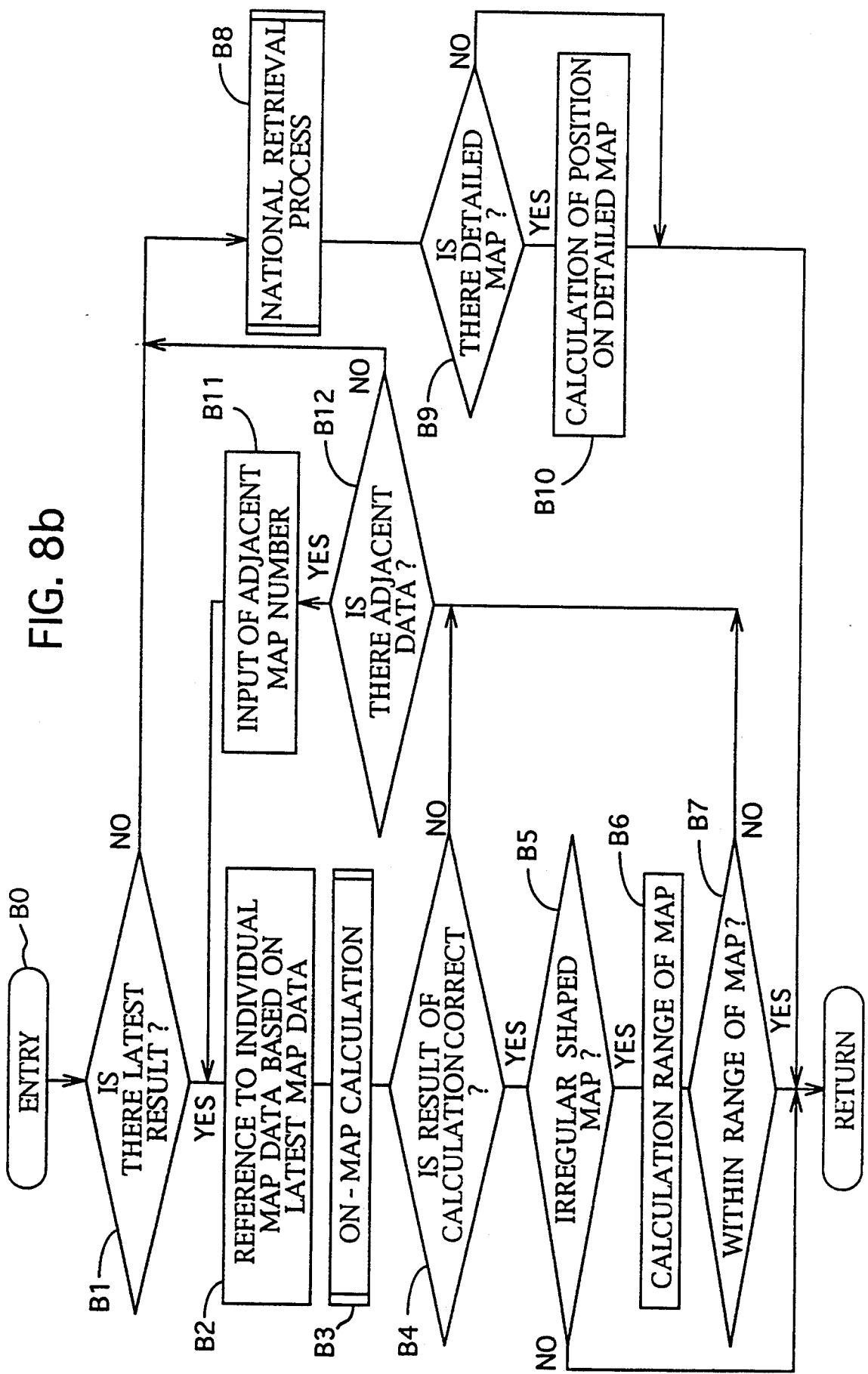

NC: LATITUDE OF CURRENT POSITION
EC: LONGITUDE OF CURRENT POSITION
NS: LATITUDE OF DESTINATION
ES: LONGITUDE OF CURRENT POSITION

NxVAL: CONVERSION COEFFICIENT IN THE LONGITUDE DIRECTION
NyVAL: CONVERSION COEFFICIENT IN THE LATITUDE DIRECTION
Ce, Cn: CONSTANT
L: DISTANCE

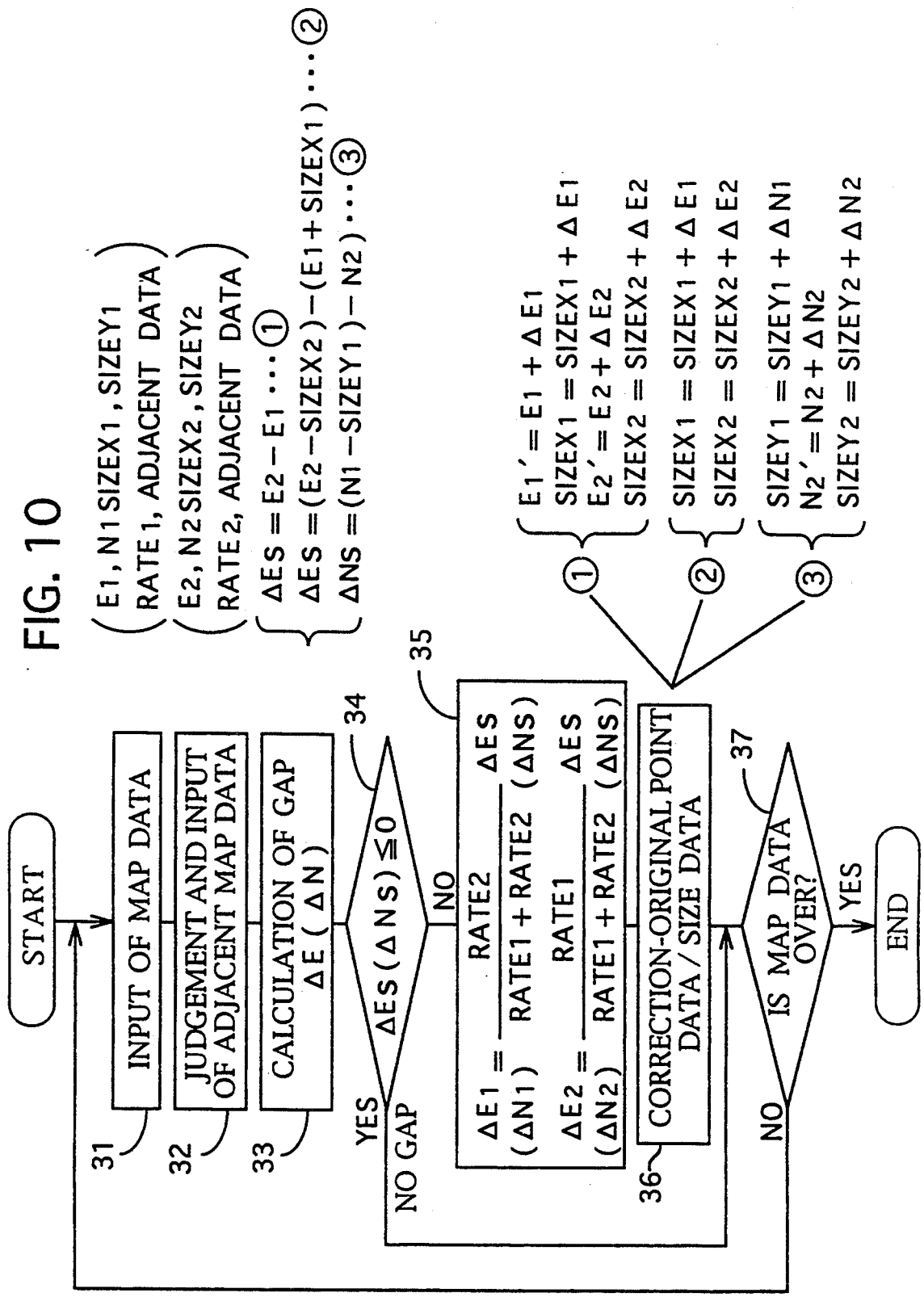

FIG. 12

PROPOSED MAP DATABASE (IN THE ORDER OF AREA)

| SECTION NO. | PROPOSED MAPS | | | | | | | |
|---|---|---|---|---|---|---|---|---|
| | 1 | 2 | 3 | 4 | 5 | 6 | 7 | 8 |
| 47 | KANAGAWA | TOKYO | SAITAMA | YAMANASHI | CHIBA | SHIZUOKA | | |
| 48 | TOCHIGI | GUNMA | SAITAMA | IBARAGI | CHIBA | | | |

PROPOSED MAP DATABASE (IN THE ORDER OF POPULATION DENSITY)

| SECTION NO. | PROPOSED MAPS | | | | | | | |
|---|---|---|---|---|---|---|---|---|
| | 1 | 2 | 3 | 4 | 5 | 6 | 7 | 8 |
| 47 | TOKYO | KANAGAWA | SAITAMA | CHIBA | YAMANASHI | SHIZUOKA | | |
| 48 | SAITAMA | TOCHIGI | GUNMA | IBARAGI | CHIBA | | | |

PROPOSED MAP DATABASE (IN THE ORDER OF MAIN ROAD)

| SECTION NO. | PROPOSED MAPS | | | | | | | |
|---|---|---|---|---|---|---|---|---|
| | 1 | 2 | 3 | 4 | 5 | 6 | 7 | 8 |
| 47 | KANAGAWA | TOKYO | SAITAMA | YAMANASHI | CHIBA | SHIZUOKA | | |
| 48 | SAITAMA | GUNMA | TOCHIGI | CHIBA | IBARAGI | | | |

FIG. 13a

| | MAP | | | | INDICATION | | |
|---|---|---|---|---|---|---|---|
| | WIDE-AREA/ NATIONAL | DETAILED/ NATIONAL | CITY/ LOCAL | DETAILED/ LOCAL | WIDE-AREA | CITY | DETAILED |
| NATIONAL EDITION IS SELECTED | × | × | × | × | × | × | × |
| | ○ | × | × | × | ○ | × | × |
| | ○ | × | ○ | × | ○ | ○ | × |
| | ○ | × | ○ | ○ | ○ | ○ | × |
| | ○ | ○ | × | × | ○ | × | ○ |
| | ○ | ○ | ○ | × | ○ | ○ | ○ |
| | ○ | ○ | ○ | ○ | ○ | ○ | ○ |
| LOCAL EDITION IS SELECTED | × | × | × | × | × | × | × |
| | ○ | × | × | × | ○ | × | × |
| | ○ | × | ○ | × | ○ | ○ | × |
| | ○ | × | ○ | ○ | ○ | ○ | ○ |
| | ○ | ○ | × | × | ○ | × | × |
| | ○ | ○ | ○ | × | ○ | ○ | × |
| | ○ | ○ | ○ | ○ | ○ | ○ | ○ |

POSITION INFORMATION PROCESSING SYSTEM FOR MOBILE

BACKGROUND OF THE INVENTION

1. Field of the Invention

The present invention relates to a position information processing system for a mobile such as a motor vehicle.

2. Description of the Related Art

There have been provided position information processing systems each of which is used for showing the current position of a vehicle and/or the distance between the current position of the vehicle and the destination which are set to be displayed. Such a system is called a "Navigation System".

One of such systems is shown in FIG. 1. In this system, display device or atlas gauge AG and a specific atlas MP, which is commercially available, are used. The atlas gauge AG includes a substantially U-shaped frame 1 and a transparent rectangular thin plate 2 which is held at its three sides by the three sides of the atlas gauge AG. A plurality of equi-spaced indicators are provided in each of a lateral side 1a and a longitudinal side 1b. On the plate 2, there are printed a plurality of lateral lines and a plurality of longitudinal lines both of which constitute a lattice configuration as a whole. The lateral lines BL and longitudinal lines BL are opposed to corresponding indicators 3H in the lateral side 1a and corresponding indicators 3V in the longitudinal side 1b of the frame 1, respectively. When the system is in use, as shown in FIG. 2, the atlas MP is set under the plate 2, through which a map on a specific or selected page can be seen. The provision of the plate 2 on the page of the atlas MP should be established in such a manner that a terminal point MPO is set to be in alignment with a corner 1c.

Thus, in this system, a specific point on the page can be represented as the combination of a lateral length and a longitudinal length both of which are measured from the corner 1c of the frame 1 and can be shown by lighting the corresponding indicators 3H and 3y. In actuality, on the basis of the previously known latitude and longitude of the criteria point PO of the specific page and a reduced scale rate of the map on the page, lateral and longitudinal distances of the point Px on the map relative to the criteria point PO brings latitude and longitude of the point Px. This leads that subject to the agreement of the criteria point of the map PO and criteria point 1c of the atlas gauge 1, the current position can be presented by lighting one of laterally arranged indicators 3H and one of longitudinally arranged indicators 3V based on latitude and longitude of the current position. The current position can be obtained by receiving electromagnetic waves from one or more satellites of GPS (Global Positioning System). For example, when a desired position is represented by the combination of one of the lateral indicators 3H which is lit in turn and one of the longitudinal indicators 3V which is lit in turn, the input of the represented position into the device can be understood for the device as latitude and longitude of the desired position.

However, in this system, latitude and longitude of the criteria point of each page, lateral length and longitudinal length of each page, the offset of the criteria point from the criteria point 1c of the atlas gauge 1 in each page, the scale reduction rate of the map on each page, and related information should be memorized. In order to indicate the current position, the page number of the atlas to which the current position belongs should be known. If it is desired that this system can be available through a specific nation such as Japan, a large amount of pages of one or more atlases should be searched, which takes a long time. Therefore, it is desirable to have a prompt or quick search of a specific page of the map in which the current position is to be included.

SUMMARY OF THE INVENTION

It is, therefore, a primary object of the present invention to provide a position information processing system which complies with the foregoing desire.

In order to attain the foregoing object, the present invention comprises a position information processing system for a mobile including detecting means for detecting the current position of the mobile, memory means for storing area information relating to a plurality of divided areas and relation information with respect to the relationship between two of the divided areas, control means for being operated in such a manner that from plural sections by which the national area is divided and in which plural prefectures are included, a specific section is selected initially and the selected section is looked up for plural prefectures in the order of a specific matter in order to obtain a page number of a map on which the current position is to be included and displaying means for displaying the page number of the selected area at present by order of the control means.

BRIEF DESCRIPTION OF THE DRAWINGS

The foregoing and other objects, features and advantages of the invention will become apparent and more readily appreciated from the following detailed description of preferred exemplary embodiments of the present invention, taken in connection with the accompanying drawings, in which:

FIGS. 4a, 4b, 4c, 4d, 4e and 4f are views, each of which show the correction between two adjacent maps;

FIG. 5c shows a memory map in which the prefectures are arranged in the priority order;

FIG. 5d shows a memory map to be used for retrieving a specific prefecture;

FIG. 5e is a view for showing the arrangement of sections in regard to Aichi prefecture;

FIGS. 6a and 6b show the contents of the individual map data;

FIGS. 8a, 8b, 8c, 8d, 8e and 8f are flowcharts each of which shows a specific operation of an electric control unit;

FIG. 10 is a flowchart showing a process for generating an individual map data by correcting an actual map data;

FIG. 12 shows three different maps in each of which plural prefectures are arranged in the priority order from a view point of a specific matter;

FIG. 13a shows the relationship between the existence of various maps and the selection mode.

DETAILED DESCRIPTION OF THE PREFERRED EMBODIMENT

Hereinafter the preferred embodiment according to the present invention will be described with reference to plural figures.

Figure 1:
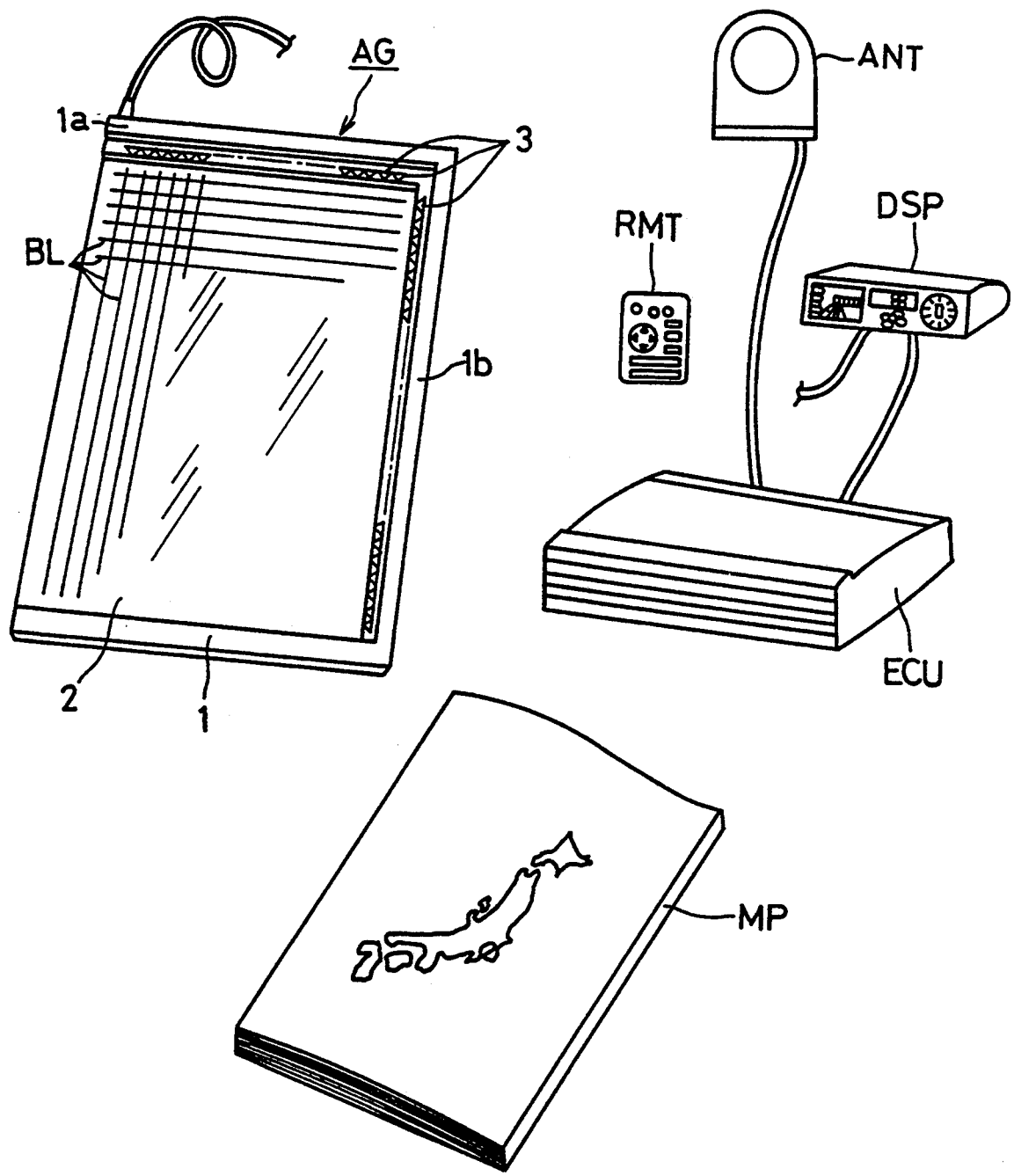
FIG. 1 is a perspective view of a whole construction of a position information processing system according to one embodiment of the present invention.
Figure 2:
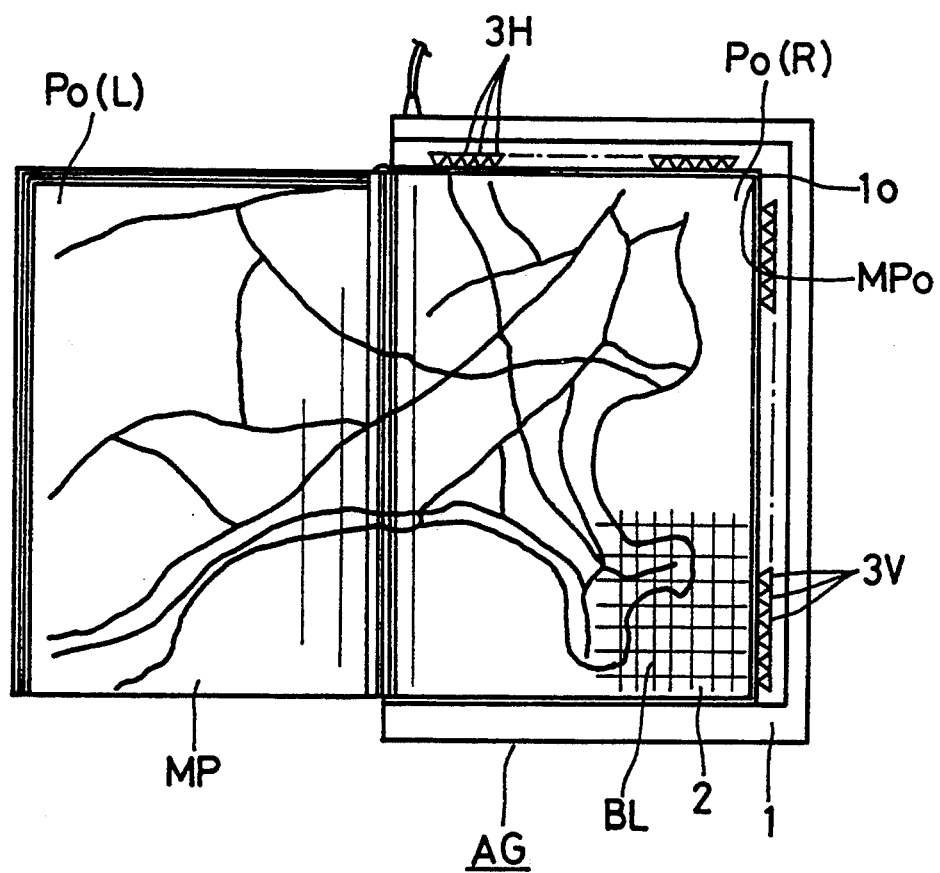
FIG. 2 is a plan view showing an atlas which is provided to a gauge.
Figure 3:
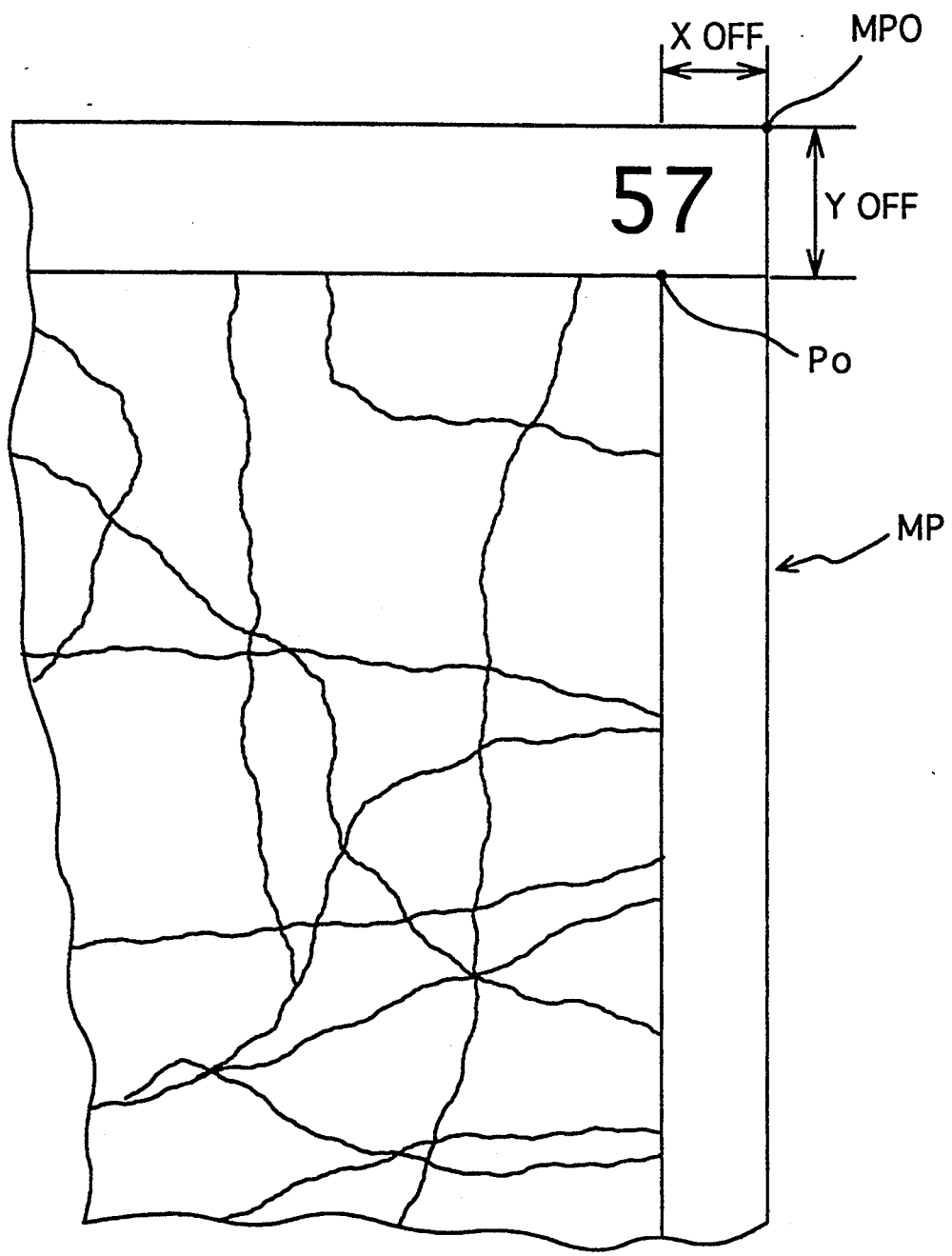
FIG. 3 is a plan view of a portion of a specific page in an atlas.
Figure 7:
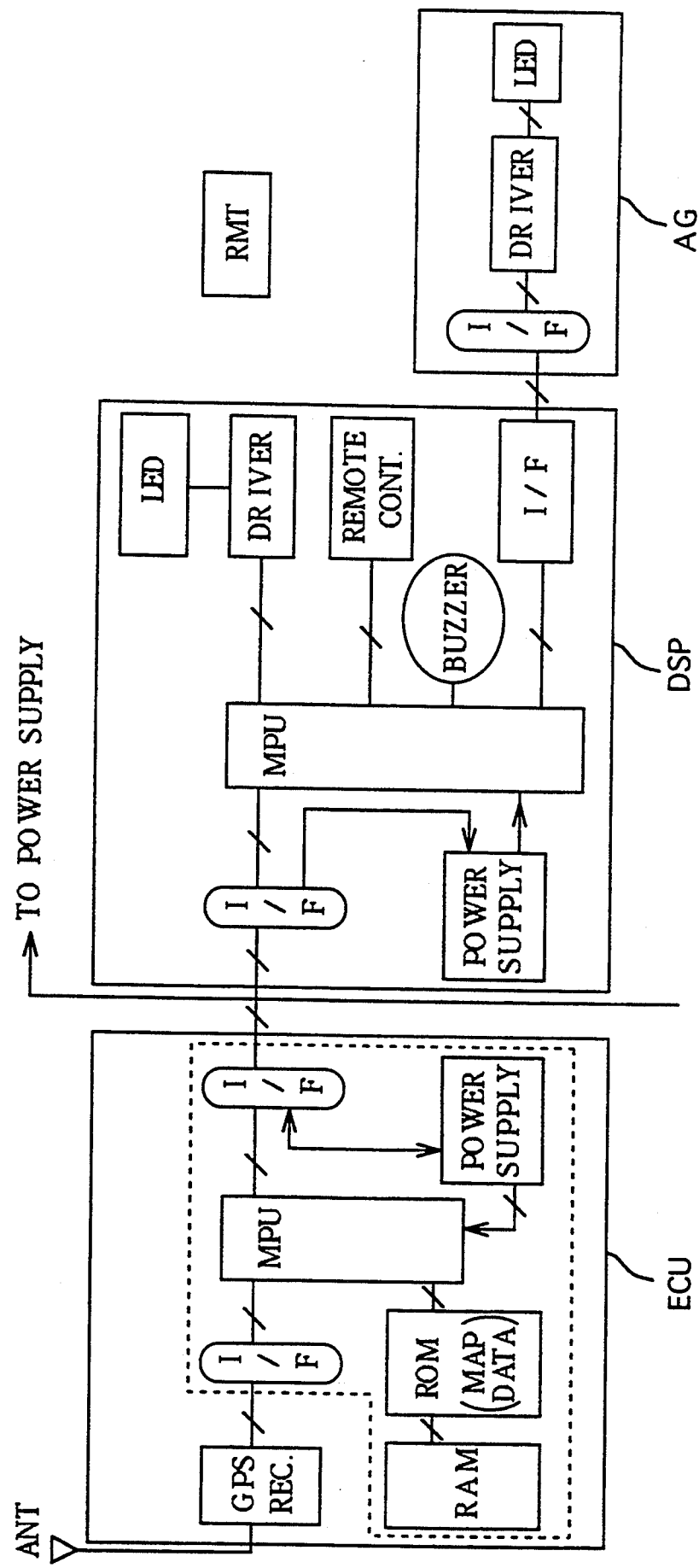
FIG. 7 is a block diagram showing the electric circuit construction of the system in FIG. 1.

Referring first to FIG. 1 showing an overall perspective view of a position information processing system or a navigation system according to one embodiment of the present invention and FIG. 7 showing a block diagram of an electric circuit for the system, the system includes an antenna ANT for receiving electromagnetic waves from one or more satellites of GPS (Global Positioning System) as a wide area positioning system. Electromagnetic waves received by the antenna ANT are fed into a GPS receiver 100 which belongs to an electric control unit ECU and are decoded into latitude data and longitude data. The unit ECU is electrically connected to a display unit DSP to which the atlas gauge AG is in electrical connection via cable means (not shown). A remote control unit RMT is set to emit infrared rays toward the display unit DSP for the control thereof.

On a calculating board in the unit ECU, there are provided a microprocessor MPU, a random access memory RAM, and a read-only memory ROM in which is previously stored information related to each map. The memory RAM is used for storing therein temporary data.

In the display unit DSP, there is also provided another microprocessor MPU which is used for processing signals from the remote control unit RMT, establishing the displaying and controlling the data communication to/from the unit ECU.

As previously mentioned, the atlas gauge AG is associated with an atlas MP and is set to indicate the current position where the system is at present through the display unit DSP. The atlas gauge AG is also used for the input of the destination. In this system, a standard atlas MP is prepared in which plural maps are included for enabling the looking up of any position in Japan.

In this system, various information is stored, as a data base, in the memory ROM, and the current position is indicated on the map on a specific page through the display unit DSP which identifies the page number of the map after referring to individual map data corresponded to the page. The individual map data is shown in FIGS. 6a and 6b.

Referring to FIGS. 6a and 6b, in this system, the individual data is set to include a map data item number, latitude EO and longitude NO of an original point of a map coordinate (unit: second), a map size (lateral direction/longitudinal direction), an offset at the original point (Xoff:lateral direction/Yoff:longitudinal direction), adjacent map information, the page number, classification (the right or the left), the reduction scale rate, existence of detailed map or not and irregular shape map data.

The offset of the original position is defined as the offset (unit:mm) of a criteria point of the map (upper-right point PO(R) in the right page/upper-left point PO(L) in the left page) relative to a specific position (the most rightwardly positioned indicator 3H and most upwardly positioned indicator 3V in the right page) when the corner MPO of the map is in alignment with the corner 1c of the frame 1. This offset is used for the correction in the calculation of the current position.

Adjacent map information includes the map data of adjacent maps which locate at rightward, upper-rightward, upper-leftward, leftward, down-leftward, downward and down-rightward positions relative to the page of a specific map data item number. If there is no adjacent map, its data is set to be indicated with zero (0). This adjacent information helps the time-reduction in the search of the next map when the position to be searched is off the map on which the searching is being performed.

The detailed map data is prepared for indicating clearly a specific area such as major area or a city, or a complex area by means of enlarged indication of the area. The detailed map data is indicated with a corresponding map number when there is a detailed map and a "0" is indicated when no detailed map is available.

Figure 11A:
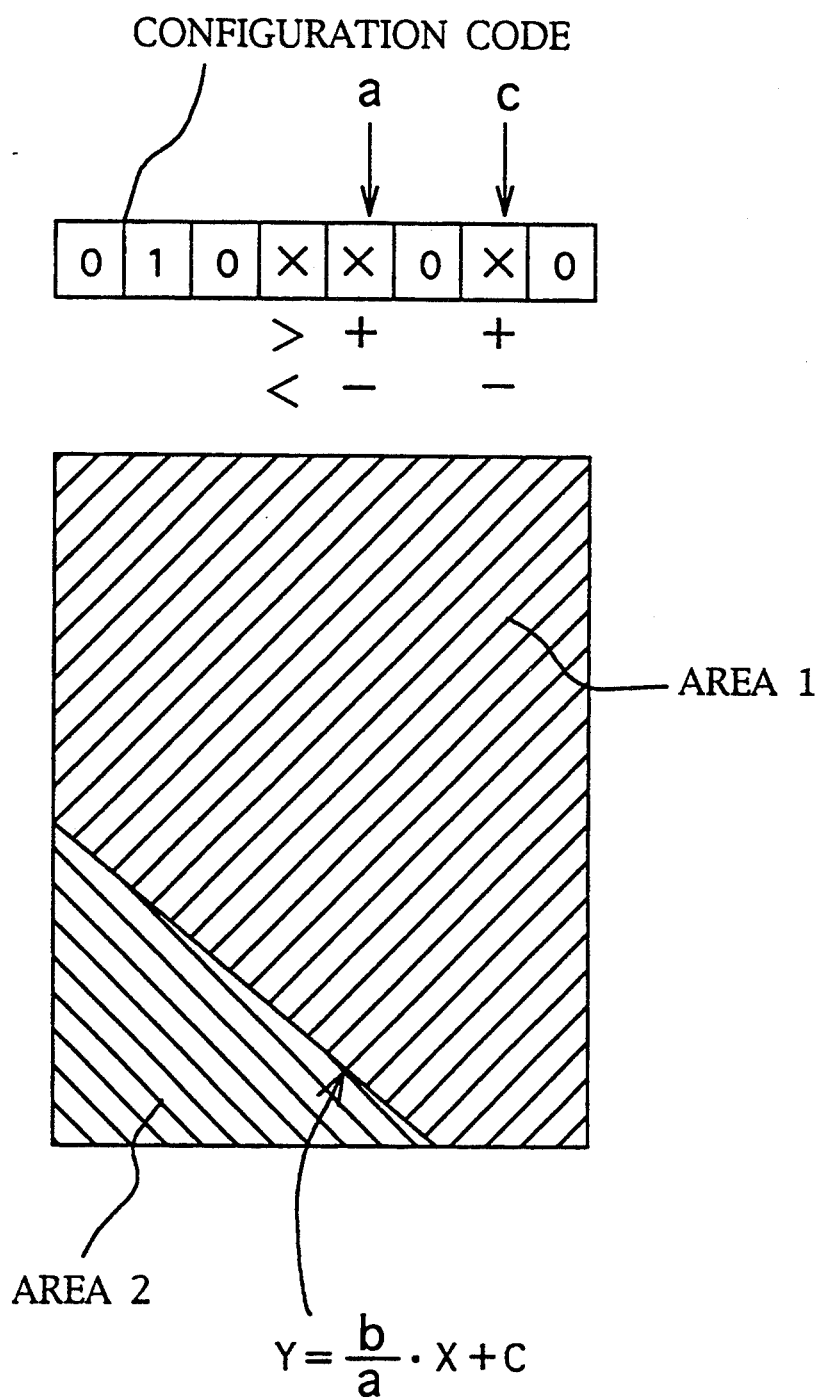
FIGS. 11a and 11b each show an area distribution in a page of an irregular shape map and a configuration code.
Figure 11B:
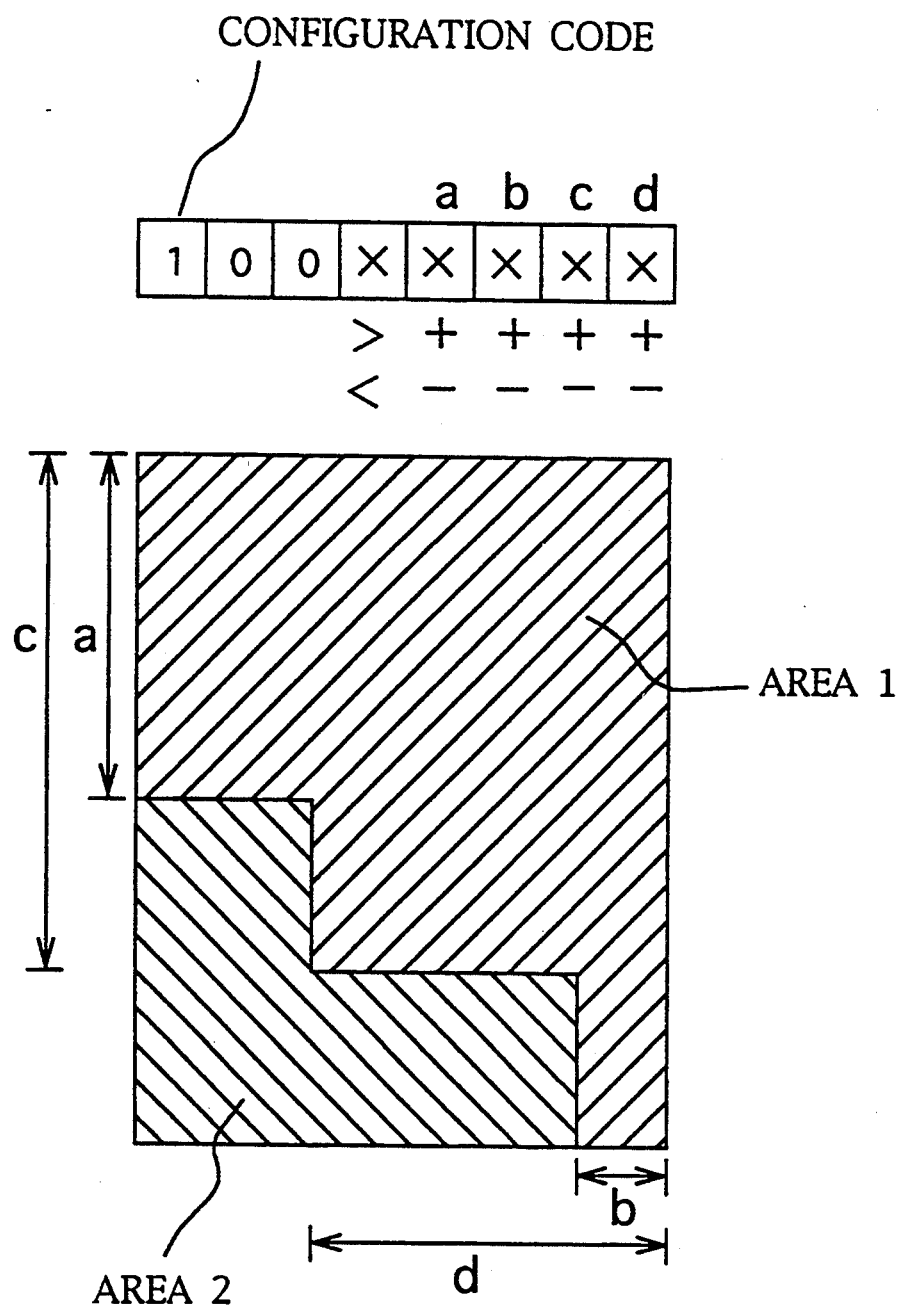

In the atlas MP, two different areas, both of which are not adjacent each other, are sometimes shown in a common page (FIGS. 11a and 11b) for the effective use of the space when the indication of sea occupies the majority of space on the page. In this case, in order to distinguish one area from the other area on the common page map and recognize each area correctly, irregular map data is prepared.

Figure 5A:
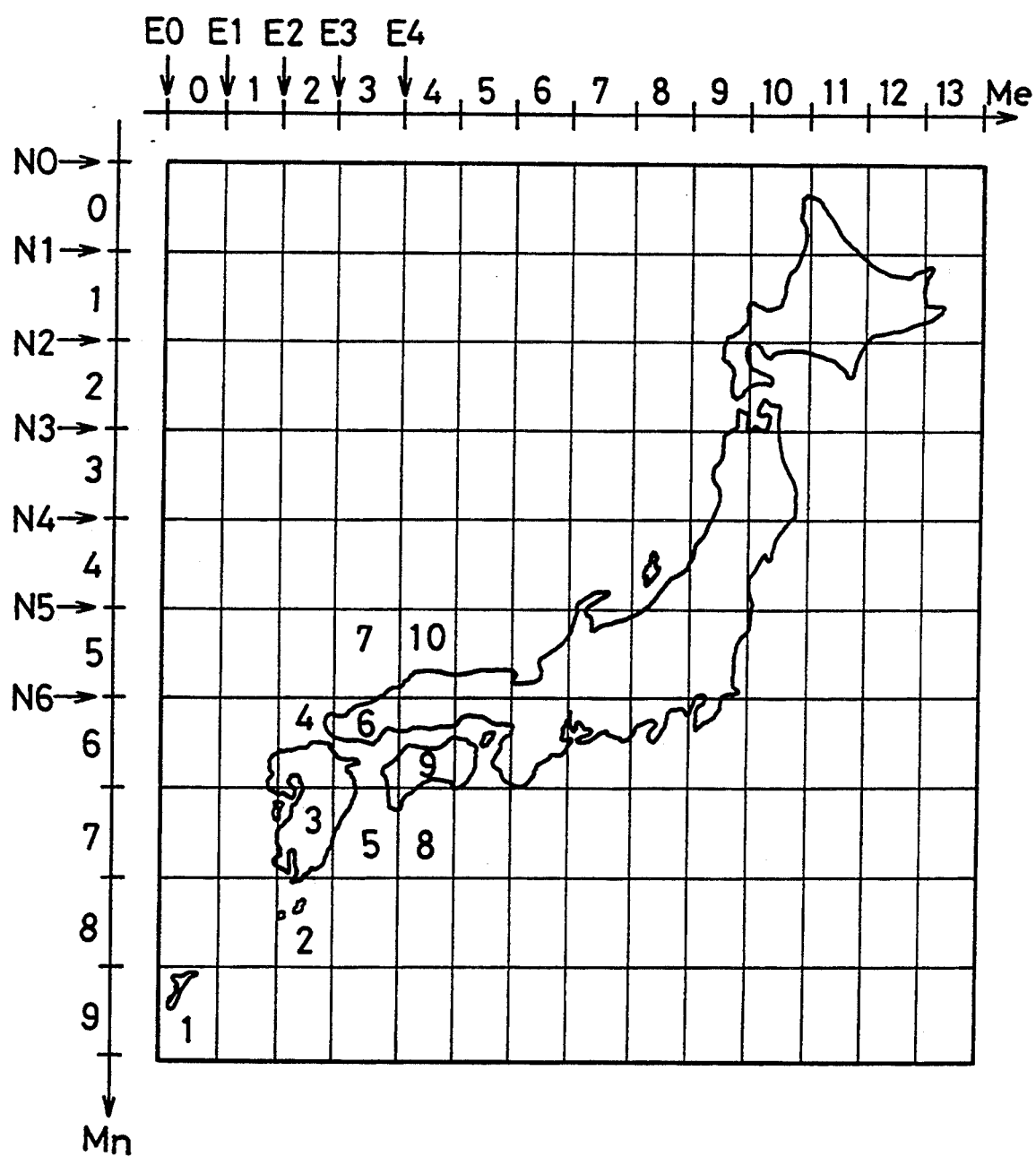
FIG. 5a is a view showing how the whole of Japan is divided by a matrix.

Hereinafter, a retrieval operation of this system will be detailed. Referring to FIG. 5a, Japan is divided into plural sections by a matrix. Each horizontal line and each vertical line of the matrix corresponds to latitude and longitude respectively. First of all, it is searched which section the current position belongs to. In detail, latitude (longitude) of the current position is compared to each boundary number N0(E0), Ni(E1), N2(E2), ---- in the latitude (longitude) direction for detecting the y-distance Mn (x-distance Me). Based on the y-distance Mn and x-distance Me, the number of corresponding sections can be obtained. Thus, sections other than the obtained sections are out of consideration. This means that data to be retrieved is reduced in amount or quantity. It is noted that the foregoing boundary numbers in the latitude and longitude directions are prepared in a table 1, as a fixed data, in the memory ROM. In addition, a table 2 showing the concordance between the obtained co-ordinates (Mn,Me) and corresponding section number is also stored as a fixed data in the memory ROM. Thus, each of the tables 1 and 2 is referred to during processing.

Figure 5B:
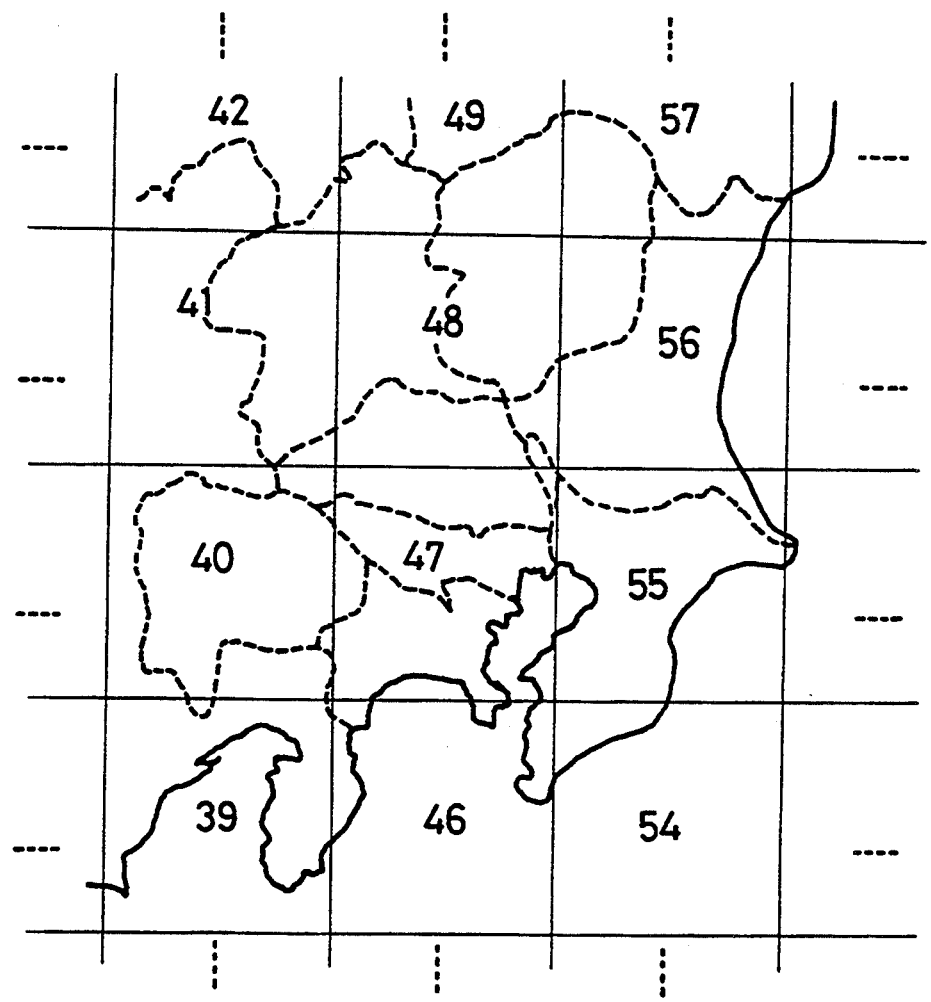
FIG. 5b is a view showing the relationship between each section of the matrix and corresponding prefecture.

FIG. 5b is an enlarged view of a specific section shown in FIG. 5a. As is apparent from FIG. 5b, in each section, one or more prefectures are included. One dotted line shows the boundary between two adjacent prefectures. It is noted that each prefecture in Japan corresponds to each state in the U.S.A. In the worst case, all information on plural prefectures in the obtained section may be processed. However, such a drawback may be eliminated by processing information relating to a specific prefecture in accordance with priorities having the high possibility of including the current position.

Figures 4F, 5C:
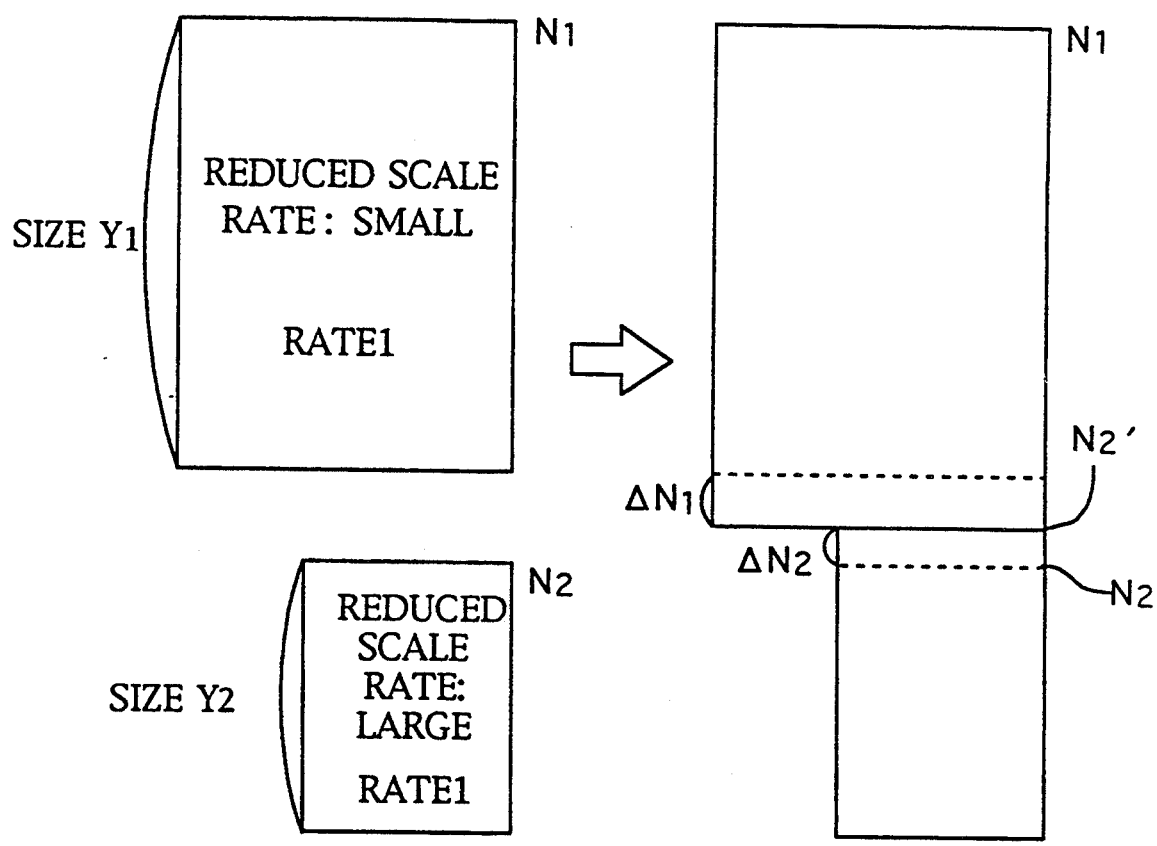

Thus, as shown in FIG. 5c, a table 3 is prepared in this system in which each prefecture's priority is previously fixed. In FIG. 5c, each matrix number is corresponded to each section number and a symbol Dn (n=1, 2, ----_denotes an identification of each prefecture. In actuality, as shown in FIG. 12, three kinds of tables are prepared and one of them is set to be selected by a switching operation. In FIG. 12, the upper table (the middle table/the lower table) is established in the order of the area scale (population density/the number of roads).

Therefore, when the matrix number 3 is selected for example, first of all, the prefecture is indicated by D6. The information processing after the selection of the prefecture will be described.

In this example, a table 4, shown in FIG. 5d and a table 5 for each prefecture, which is shown in FIG. 5d, are prepared as fixed data. In table 4, a rectangular area as shown in FIG. 5e is imagined for including the overall prefecture. Each division is set to be considered to each corresponding portion of each page of the atlas MP. Some of the divisions don't belong to the selected prefecture because the real prefecture is not rectangular in shape, as is seen in table 5.

Referring to FIG. 5d, in table 4, latitude No' and longitude EO' of an original point of the prefecture which is at a lower left of the division of the rectangle, the distance in the direction and the distance in the longitudinal direction (unit: 2 seconds), the number Nn of the division in the latitude direction, the total number Nt, and unit length x and unit length y of each division in the latitude and longitude direction (unit: 2 seconds) are stored. In the case of Aichi prefecture in FIG. 5d, since Nn=9 and Nt=9, each division corresponding to each map on the page is assigned with a proper number as shown in FIG. 5e. The ranges in the latitude and the longitude directions of each division as shown in FIG. 5e are based on the coordinates of each division, EO', NO', x and y. Thus, by obtaining latitude and longitude of the current position, the map to which the current position belongs can be fixed.

Figure 5F:
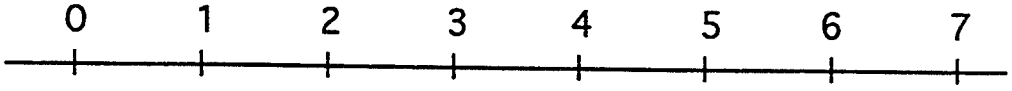
FIG. 5f shows a memory map indicating the relationship between a section of the map and a number of the individual map data.

A table 5 shown in FIG. 5f illustrates the agreement between division number in FIG. 5e and the map data number. As to a specific division, it may sometimes not belong to the map. In this case, by assigning a special code, the division is indicated to be off of the map. In FIG. 5f, the number of each division can be obtained by the formula of (vertical coordinates×8+horizontal coordinates). For example, the 10th division is located at a location which depends on 1 of the vertical coordinate and 2 of the horizontal coordinate. In the division which is thus obtained, "86" has been stored or registered as the map data number. In other words, if the current position is within the 10th division, the map data number of the map to be looked up is 86. If the obtained map data number denotes that the current position is out of Aichi, with reference to table 3, shown in FIG. 5c, the next prefecture should be searched.

Referring to table 6 (FIGS. 6a and 6b) by using the obtained map data number, it is possible to obtain the individual map data of the area to which the current position belongs.

Next, actual operation of the device will be described hereinafter. The details of the operation of the electric control unit ECU are shown in the form of flow charts as illustrated in FIGS. 8a through 8f.

Figure 8A:
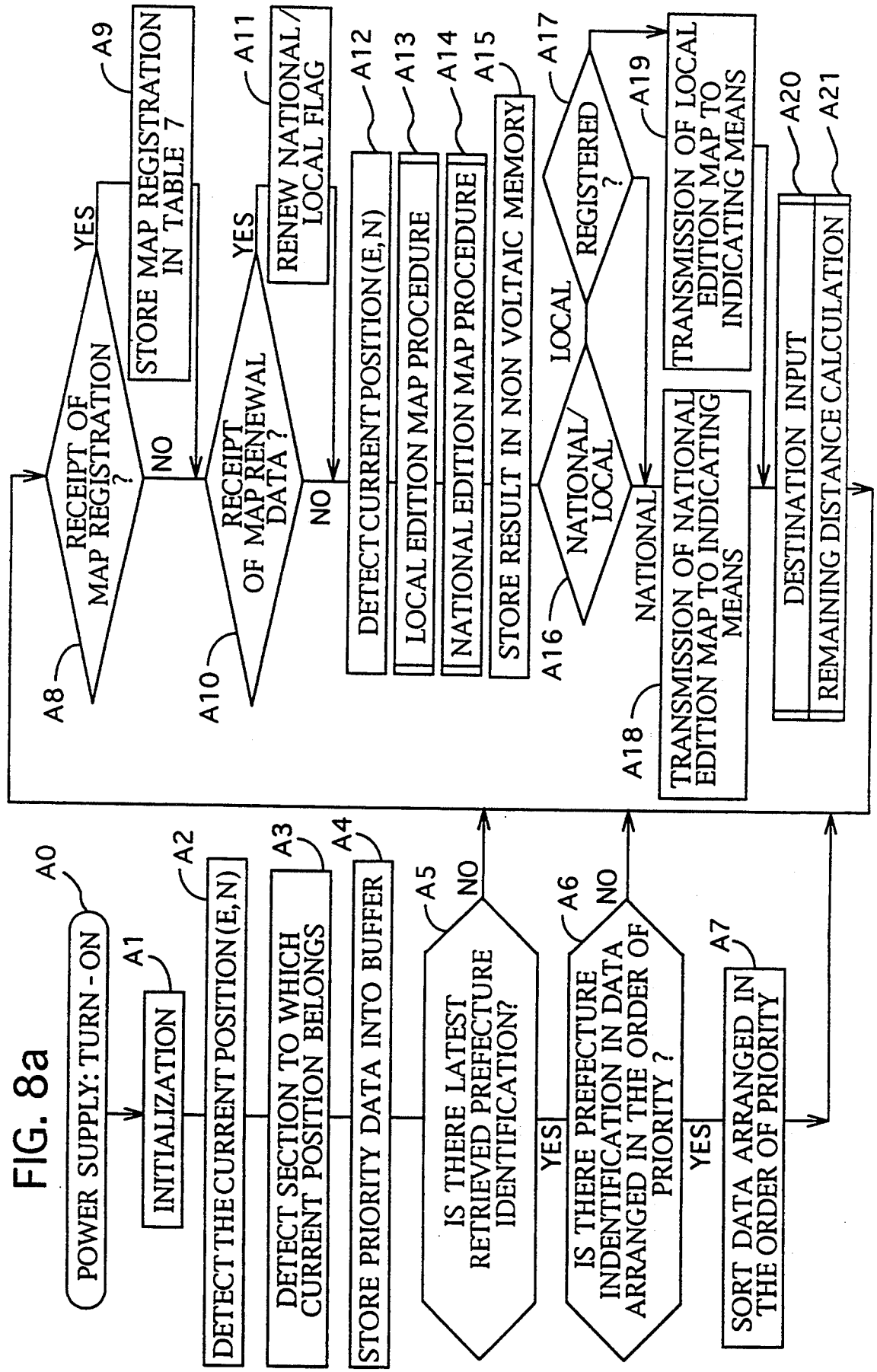

Referring to FIG. 8a, when the power supply is turned on, an initialization is performed (step A1) and then inputted latitude and longitude of the current position from the GPS receiver )step A2). In the next step, or step A3, a section to which the current position belongs, is detected or selected from plural sections in the form of the matrix shown in FIG. 5a by the foregoing manner.

In step A4, table 3 shown in FIG. 5c is compared to the resulting section number for obtaining priority data and the resulting data is stored in a buffer in the memory RAM. For example, when the section number is 3, a set of data including D6, D7, D8, D9, D10 and D11 is stored in the buffer.

In this system, at each time when the retrieval of the map is established in success, in step A1–6, the result is set to be stored in a non-volatile memory. Thus, the latest result of the retrieval can be known by referring to the nonvolatile memory even though the device is in a condition immediately after the power supply is turned on. In step 5A, by referring to the contents of the non-volatile memory, it is checked whether there is a prefecture's identification (Dn in FIG. 5c) which is included in the result of the latest retrieval. If normal, the answer is positive and the control goes to step A6. In step A6, it is checked whether there is a prefecture's identification in the buffer, which is identical to the detected prefecture's identification. If so, step A7 is executed. In this step, the set of data in the buffer is sorted so that the prefecture identification which has been detected in the latest retrieval, may occupy the first position. For example when the data in the buffer is arranged in the order of D6-D7-D8-D9-D10-D11, and the latest retrieved prefecture's identification is D8, the arrangement of the data is changed to be in the order of DS-D6-D7-DS-D9-D10-D11 and the latest retrieved prefecture's identification is D8, the arrangement of the data is changed to be in the order of D8-D6-D7-D8-D9-D10-D11. So long as the D8 is at the beginning, other arrangements are possible. Thereafter, the sorted data in the buffer is used. Executions in steps A8 through A21 are set to be established as long as the power source is turned off.

In this system, all page numbers of an atlas of local edition can be stored or registered in table 7 (FIG. 6b) in the non-volatile memory. Upon this registration, signals from the remote control unit RMT are processed in the display unit DSP and the resulting map registration data is fed to the control unit ECU. Upon receipt of the map registration data (step A8), the unit ECU stores this data in table 7 in step A9.

In this system, by the manipulation of the remote control unit RMT, the atlas of the local edition can be replaced with an atlas of the national edition and vice versa. Upon receipt of a signal for this replacement or renewal, the display unit DSP transmits a signal or a map renewal data depending on the received signal control unit ECU. Upon receipt of the map renewal signal in step A10, the control unit ECU reverses a national/local flag and changes an indication mode.

In step A12, an input of latitude N and Longitude E of the current position is established by receiving information from GPS.

In step A13, the retrieval and calculations are performed for the data corresponding to the atlas of the local edition and in the next step A14, similar processings are performed for data corresponding to the atlas of the national edition. The results in steps A13 and A14 are set to be stored in the non-volatile memory in step A15.

In step A16, the condition of the national/local flag is checked for identifying which is selected, the national edition atlas or the local edition atlas. If the national edition atlas (local edition atlas) is selected, step A18 (step A17) is set to be executed. In step A17, it is checked whether the number of the atlas obtain in step A13 is registered in table 7. If the answer is positive (negative), step A19 (A18) is set to be performed.

In step A18 (step A19), the result of the processing in step A14 (step A13) relating to the data of the national edition atlas (the local edition atlas) such as the current position is fed to the display unit DSP. Thus, even though the user has selected the mode for the local edition atlas, the mode is changed automatically into one for the national atlas mode while the current position is in an area which is now shown in the user's atlas.

In step A20, a processing is executed relating to an input of the destination. In step A21, a straight distance between the current position and the destination is calculated as a remaining distance.

Next, the detailed operation of the processing in step A13 for the local edition atlas will be described. Due to no remarkable difference between the processing of the local edition atlas and that of the national edition atlas, the detailed description relating to the latter is omitted.

The contents of the processing for the data of the local edition atlas is shown in FIG. 8b. In this processing, at first, step B1 is executed. In this step, it is determined whether the latest result of the retrieval remains in the memory or not. If so, in step B2, individual map data is referred to by utilizing the latest map data number or the number of the map. If not, for the necessity of obtaining the required individual map data, step B8 is executed, in which national retrieval is established.

Figure 8C:
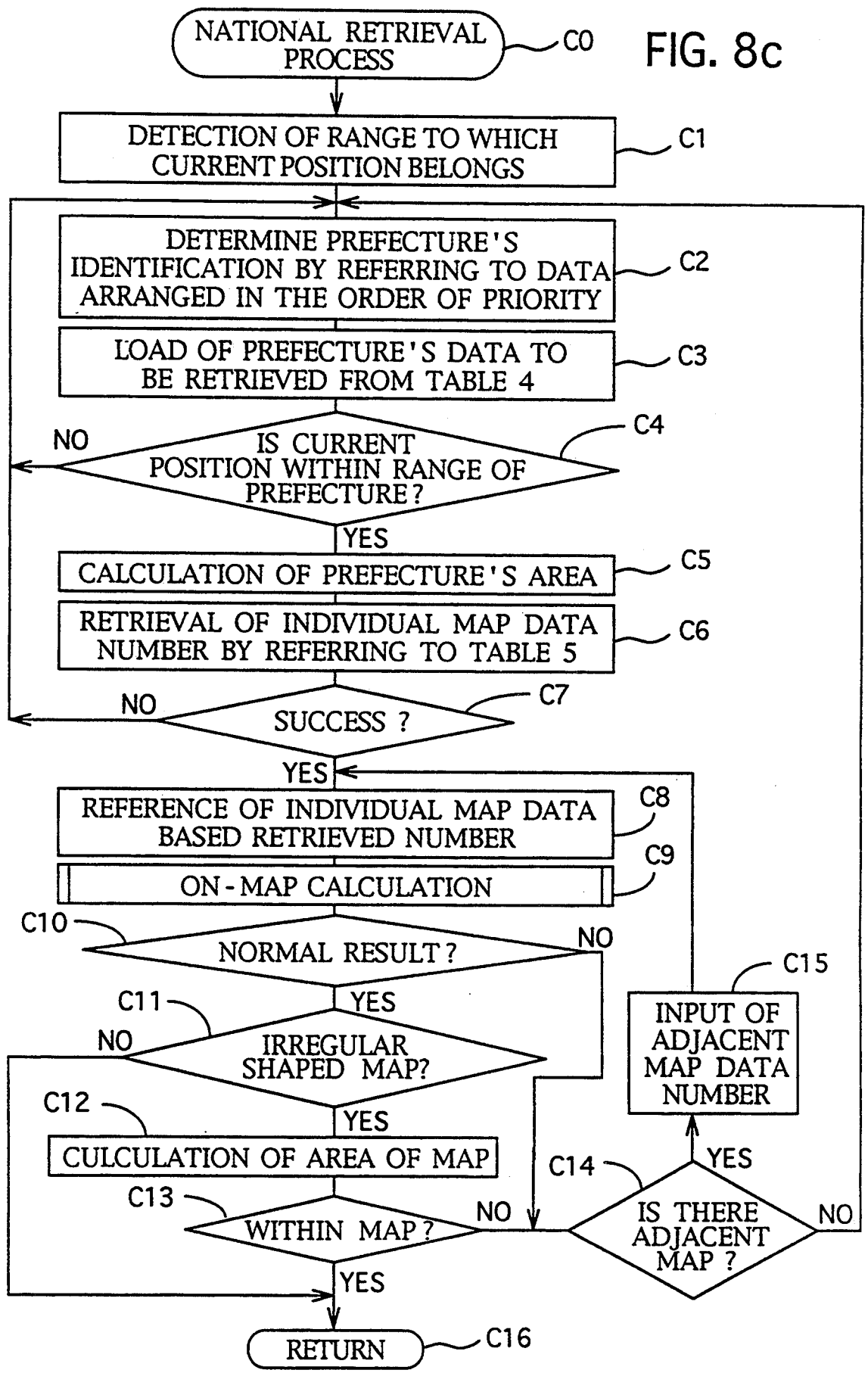

FIG. 8c shows the contents of the national retrieval processings. In step C1, as mentioned above, one section to which latitude and longitude of the current position is selected from the matrix shown in FIG. 5a. In step C2, the prefecture's identification is determined with reference to the priority data (cf. table 3 in FIG. 5c) in the buffer. If the first case, the highest priority prefecture is selected. In step C3, data relating to the selected prefecture is loaded into the memory RAM from table 4 shown in FIG. 5d. In step C4, this prefecture's range is determined based on latitude and longitude (EO' and NO') of the original point of table 4 and the area size (X,Y) and a check is performed whether the current position is within the resulting range. If so (not), step C5 is performed. Step C2 is performed for searching another prefecture.

In step C5, based on EO', NO', Nt, x and y, divisions are calculated as shown in FIG. 5e and one division is detected or selected to which the current position belongs. In step C6, the individual map data number corresponding to the detected division number is retrieved with reference to table 5 as shown in FIG. 5f. As a result of the looking-up of table 5, when the individual map data is found, step C8 is executed. Otherwise, step C2 is executed.

In step C8, based on the resulting individual map data number, the contents of the individual map data in table 6 shown in FIGS. 6a and 6b is referred to. In step C9, calculation is performed to now where the latitude and longitude of the current position are in the range of the selected map. The details of processing will be shown in FIG. 8d.

Figure 8D:
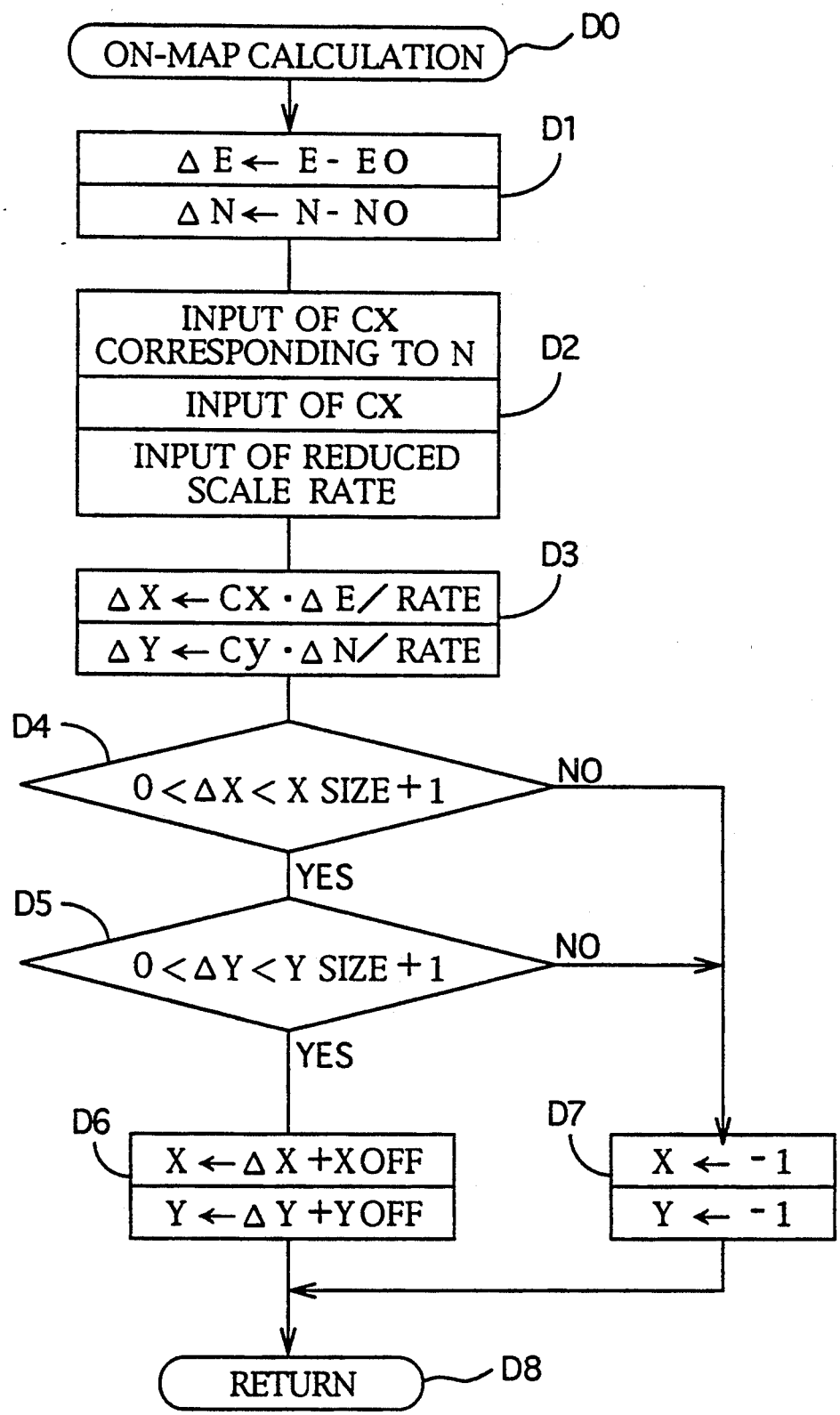

Referring to FIG. 8d, a difference in latitude delta-E between latitude of the current position and latitude of the original point of the individual map data is obtained. Similarly, a difference in longitude delta-N is also obtained.

In step D2, various parameters are inputted which are used for the calculation. The constant Cx is a coefficient used upon conversion of the longitude-difference into the horizontal distance and varies according to latitude. Thus, suitable Cx is set to be obtained. The constant Cy is for converting the latitude-difference into the vertical distance and is a fixed value. The reference symbol RATE denotes the reduced scale rate of each map and is set to be obtained from each individual map data.

In step D1, the horizontal distance delta-X (the vertical distance delta-7) between the current position and the original point of the map is calculated. In steps D4 and D5, it is checked whether the current position moves out of the map or not. That is, delta-X (delta-Y) is compared with the range O - X size corresponding to X' on the individual data map )the range O - Y size corresponding to Y' on the individual data map).

If both of delta-X and delta-Y are within the respective ranges, step D6 is performed wherein delta-X (delta-Y) is added with the offset X off (Y off) to obtain the X-distance (Y-distance) of the current position on the atlas gauge AG. If either of delta-X and delta-Y is out of the map, step D7 is executed and error value of −1 is substituted to both X and Y.

Referring back to FIG. 8c, in step C10, whether the result of calculation is normal or not is checked. That is to say, whether the value of X (Y) is the value of the error constant of −1 is checked. If normal (abnormal), step C11 (step C14) is executed.

In step C11, it is checked whether the map under consideration is in the form of the irregular shaped map or not by reading information in the irregular shaped map column. If so, step C12 is executed and the range of the actual map is calculated.

For example, if the configuration code (pattern G) is 010XX0X0 (X is 0 or 1), the map belongs to one of the area 1 and the area 2 and the function showing the boundary therebetween of $Y=(b/a)X-c$ is compared to X and Y of the current position for knowing whether the current position is within the range of the map. Depending on the area, the 4th bit of the configuration code is reversed. The configuration code also denotes the sign of parameter (a, b, c, d).

If the current position is out of the area of the map, the control proceeds from step C13 to step C14. In step C14, it is checked whether there is the adjacent map or not by referring to the column of the adjacent map. If so, after inputting the map number, step C8 is again executed. If not, the control is returned to step C2.

Referring back to FIG. 8b, upon completion of national retrieval, the control goes to step B9. In step B9, it is checked whether there is the detailed map or not by referring to the individual map data. If so, step B10 is executed for calculating the current position on the detailed map with reference to the individual data of the detailed map.

On the other hand, if there is the latest result of the retrieval, based thereon, on-map calculation is performed. As a result of this, the current position is out of the map and step 8B is executed for processing national retrieval. In the case of the irregular shape map, the range of the detailed map is calculated. In this case, if the current position is out of the map, step B8 is executed.

Figure 8E:
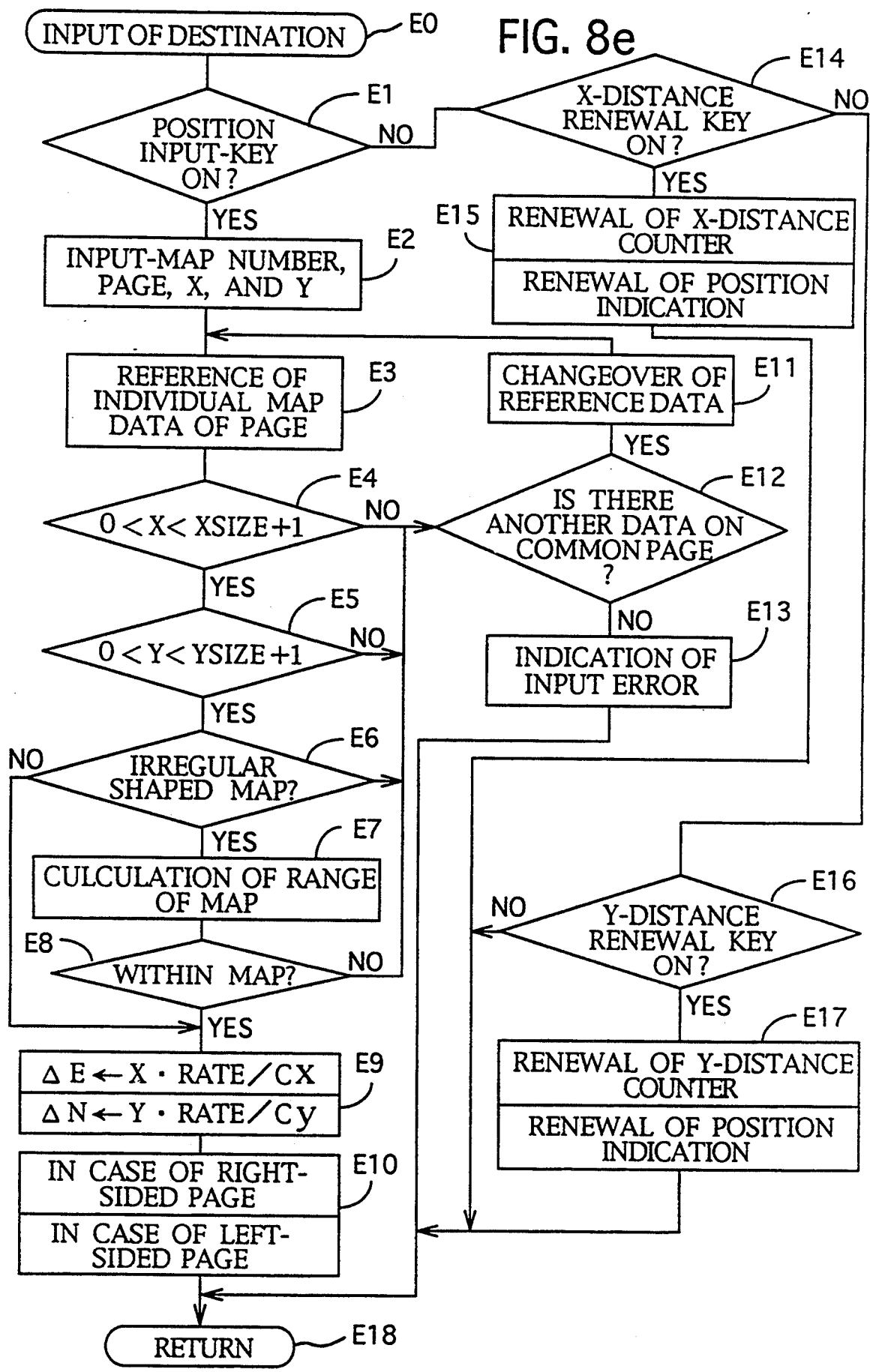

Next, destination input processing is described with reference to FIG. 8e. Under the destination input mode, an X-distance renewal key, a Y-distance renewal key and a position input key each of which (not shown) is provided on the remote control unit RMT, are used. Upon manipulation of the X-renewal key, the control is processed from step E14 to step E15. Then, the value of X-distance counter is renewed and accordingly, the indicator 3H is lit which is adjacent to the left of one which was the latest lit. IF the indicator 3H to be lit is beyond the most left one, the most right indicator is lit. Similarly, upon manipulation of the Y-renewal key, the control goes to step E17 from step E16. The, the value in the Y-distance counter is renewed and accordingly, the indicator 3V is lit which is adjacent to the upper side of one which was the latest lit. If the indicator 3V to be lit is beyond the lower one, the most upper indicator 3V is lit.

Upon manipulation of the position input key, based on the condition at this time, the position is calculated. First, in step E2, the number of atlas under consideration, the page number under consideration, the value of the X-distance and the value of the counter of Y-distance. In the next step, or step E3, individual map data of the page is inputted.

In steps E4 through E8, it is checked whether the designated position is within the area on the map or not. That is, in step E4 (E5), the distance (the Y-distance) of the designated point is within the X-distance (the Y-distance) on the map. In step E6, the map is checked whether it is in the form, of the irregular shaped map or not. If so, the correct range is investigated in step E7 and a check is performed whether there is the designated point in the range.

When the designated point is out of the range, at first, in step E12, it is checked whether there is another map on the same map or not. If so, the individual map data of the map is inputted in step E11 and the control is returned to step E3.

When it is confirmed that the coordinates of the designated point are within the map under selection, steps E9 and E10 are executed. In step E9, based on the X-distance (X) of the designated point, the reduced scale rate of the individual map data (RATE) and constant (Cx), the longitude-difference delta-E between the X-distance (X) of the designated point and the original point of the map is calculated. Similarly, the Y-distance (Y) of the designated point, the reduced scale rate (RATE) of the individual map data and constant (Cy), the latitude-difference delta-N between the Y-distance (Y) of the designated point and the original point of the page. In step E10, the difference-latitude delta-N obtained in step E9 is subtracted from latitude No of the original point of the page of the individual map data. Latitude and longitude (Ni and Ei) of the designated point are also calculated by adding or subtracting longitude EO of the original point of the map of the individual map data to or from the difference-longitude delta-E.

Figure 8F:
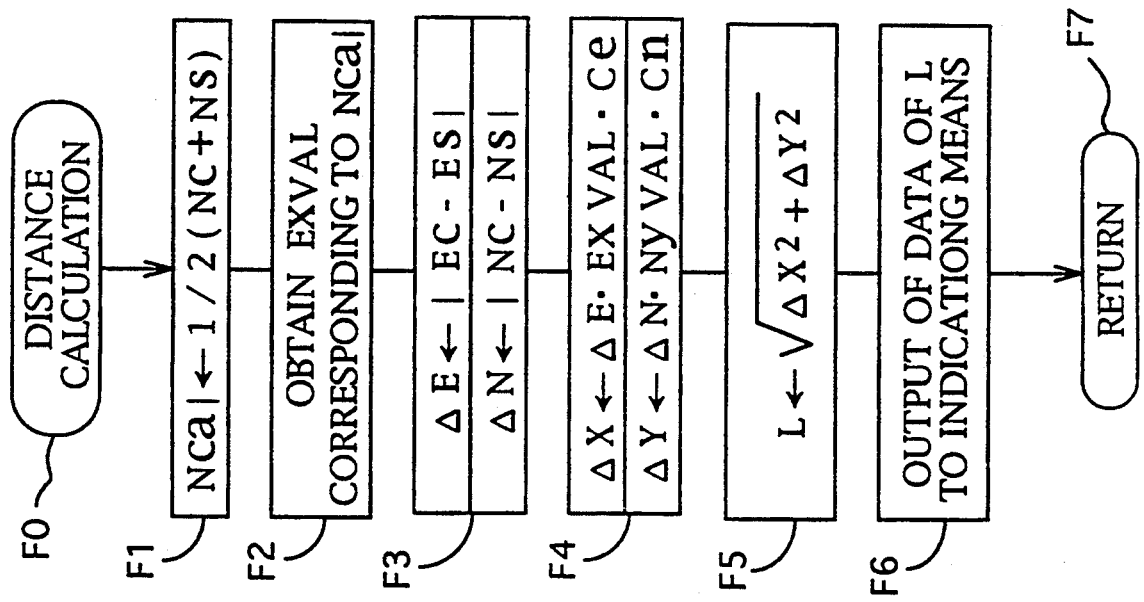

The distance calculation processing will be described with reference to FIG. 8f. In this processing, a straight distance is et to be calculated between the current position and a previously set destination. This calculation requires the conversion of each of the difference-latitude and the difference-longitude into the distance. The coefficient ExVAL to be used in the conversion of the difference-longitude into the distance varies depending on latitude. Thus, in the conventional calculation, a large error occurs or long time processing is required. In light of this, the conversion coefficient ExVAL is utilized which is corrected regarding latitude of an intermediate position between the current position and destination. This brings the deletion of the repeat of the calculation and the reduction of error due to the fact the errors between higher latitude side and lower latitude side are cancelled relative to each other.

In step F1, latitude Ncal of the intermediate position is based on latitude of the current position and latitude of the destination.

In step F2, the conversion coefficient ExVAL corresponding to latitude of the intermediate position Ncal is obtained by referring to a table. In this embodiment, each conversion coefficient is prepared every 6 minutes of latitude, which is intended to obtain an accurate conversion coefficient at each latitude.

In step F3, the difference-longitude delta-E (the difference-latitude delta-N) is calculated on the basis of longitude (latitude) of the current position and longitude (latitude) of the destination.

In step F4, the difference-longitude delta-E (the difference latitude delta-Y), is converted into the distance delta-X (delta-Y) by using the coefficient NxVAL (NyVAL). The coefficient NyVAL is constant.

In step F5, the straight distance L between two points is calculated based on the distance delta-X in the longitude direction and the distance delta-Y in the latitude direction and the resulting distance L is set to be outputted to the display unit DSP in step F6.

Figure 9:
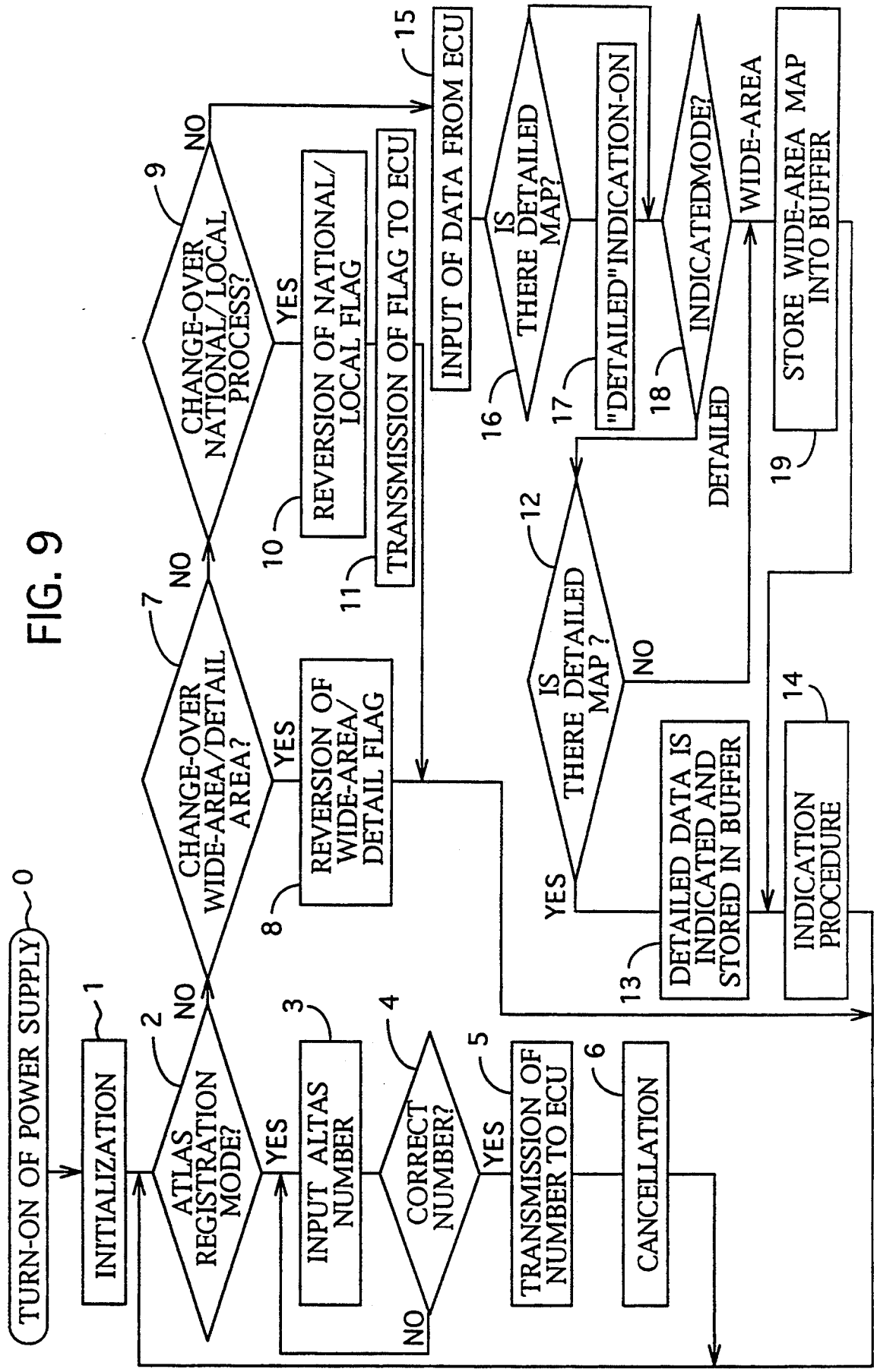
FIG. 9 is a flowchart showing an operation of a microprocessor in a display unit.

FIG. 9 illustrates the operation of the microprocessor MPU in the display unit DSP. When the power supply is turned on, an initialization is established (step 1) and is set to be ready for operation based on the code input from the remote control unit RMT and the data input from the electric control unit ECU. Upon manipulation of a map registration key (not shown), the map registration mode is established. When in this mode, the control proceeds to step 3 from step 2. When the number of the atlas is inputted (step 3), in the next step, or step 4, the validity of the number is checked in such a manner that the number is within the range assigned to the map. If there is a positive result, in step 5, the inputted number is transmitted to the control unit ECC. Thereafter, automatic cancellation of the map input mode is established (step 6).

Upon manipulation of a wide-area/detail change key on the remote control unit RNT and the control goes to step 8 from 7, a wide-area detail flag is reversed or inverted.

Upon manipulation of a national local change key on the remote control unit PaT, the control goes to step 10 from step 9 and a national/local flag is reversed or inverted. Furthermore, in step 11, the national/local flag is transmitted to the control unit ECU.

Under normal operation mode, the input of data from the control unit ECU is established (step 15), the identification is established whether there is the detailed map or not in step 16 and if so "Detailed" is indicated in step 17.

Figure 13B:
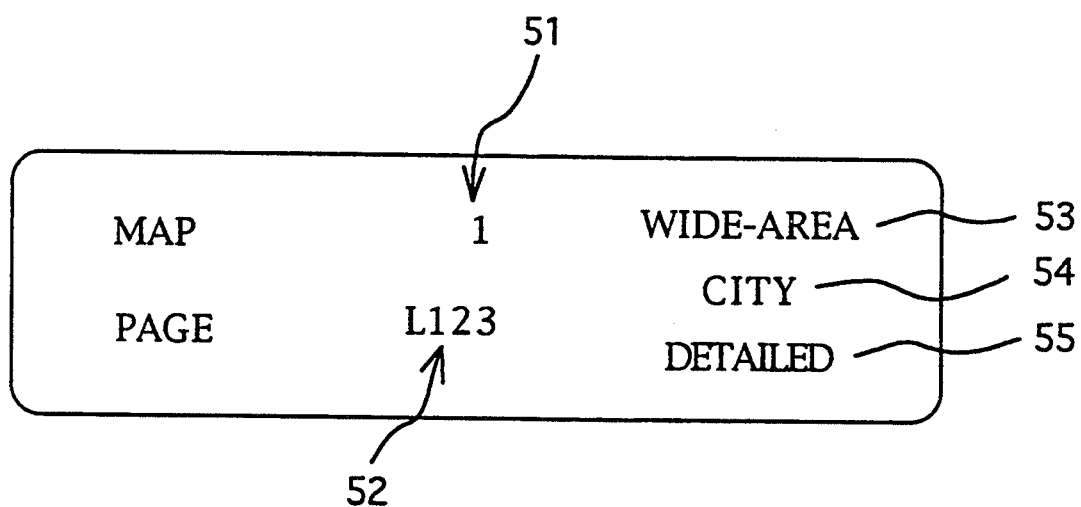
FIG. 13b is a plan view of a portion of a front panel of a display unit.

In the actual operation, in each of steps 16 and 17, the complex processing is performed as follows: At a portion of a front panel of the display unit DSP, as shown in FIG. 13b, a map number indicator 51 for indicating the number of the map under selection, a page of map indicator 52 for indicating the page number of the selected map at present and the position (L,R), a wide-area indicator 53, a city-area indicator 54 and a detail indicator 55 are provided. The indicators 53, 54 and 55 are controlled as shown in FIG. 13a based on whether there are various maps or not and the selected map is the national edition or local edition. In FIG. 13a, "0" ("X") denotes the existence (non-existence) of the map or the lighting (non-lighting) of the indicator. For example, when (1) there is the wide-range map including the current position and there is not detailed map in the national edition atlas,
(2) there is the city-area map including the current position and there is not detailed map in the local edition atlas, and
(3) the user selects the local edition atlas, the wide-area indicator 53 is not lit. In a specific area illustrated in the detailed map, due to existence thereof, the detail indicator 55 is lit, thereby indicating the existence of the detailed map when the user selects the side-area.

Referring back to FIG. 9, in step 18, the wide-area/-detail flat is checked and if the mode is in the wide-area area one (the detail one), step 19 (step 12) is executed. In step 12, it is checked whether there is detailed map data in data from the unit ECU and if so (not) step 13 (step 19) is executed. That is, despite the user's selection of the detailed mode in the case of non-existence of the detailed map relating to the current position the wide-area mode operation is performed.

In steps 13 and 19 of the detailed map and data of the wide-area map are stored into a buffer for the indication.

In step 14, the required information is indicated after processing data in the indication buffer. In this indication, the control of lighting the indicators (3H, 3V) on the atlas gauge AG is included. By looking at the indicators 3H and 3V, both of which are lit, the user can read or recognize the current position from the map which is associated with the atlas gauge AG.

In the actual atlas, when a wide-area is divided into plural sections, each section is not always printed on the corresponding page correctly or accurately. For example, in the case of two adjacent sections in the longitude direction, sometimes the upper-right side of the left page and the upper-left side of the right page are not out of concordance with each other in respect to longitude. Though such out-of-concordance or discrepancy is in the direction of the overlap does not matter, when the discrepancy is in the direction of generating a gap between both pages, the use of data as it is, an area where it is not indicated on the map is generated and the current position can't be indicated while the current mode is in such area.

In light of this, in this embodiment, such area is not to be generated by the correction process. FIG. 10 shows the correction process and FIGS. 4a through 4f show the changes of the map across the correction. The details of the correction process will be explained hereinbelow.

Referring to FIG. 10, in step 21, a specific individual map data is inputted. In this correction process, longitude E1 of the original point of the map, latitude N1 of the original point of the map, the size SIZEX1 of the map in the longitude direction, the size SIZEY1 of the map in the latitude direction, the reduced scale rate RATE1 and adjacent data are used.

In step 32, the individual map data of the map which is adjacent to the map whose individual map data is inputted in step 31. In this step, longitude E2 of the original point of this map, latitude N2 of the original point of this map, the size SIZEX2 of the map in the longitude direction, the size SIZEY2 of this map in the latitude direction and the reduced scale rate RATE2 are inputted.

Obviously, numerous modifications and variations of the present invention are possible in light of the above teachings. It is therefore to be understood that within the scope of the appended claims, the invention may be practiced otherwise than as specifically described herein.

What is claimed is:

1. A position information processing system for use with an atlas having a plurality of pages for illustrating different districts of an area on said pages and adapted to be mounted on a mobile, the system comprising:
   detecting means for detecting a current position of the mobile;
   memory means divided into a plurality of segments for storing only the respective page numbers of said atlas in a sequence having a predetermined priority;
   control means for searching said memory means and retrieving a selected page number instead of the associated map corresponding to the district including the current position of the mobile; and
   display means for indicating the retrieved page number of the atlas.

2. A position information processing system as set forth in claim 1, wherein said priority is determined on the basis of frequency of use of each of said districts.

3. A position information processing system as set forth in claim 2, wherein the frequency of use depends on at least one of the extend of the district, the population of the district and the number of arterial roads in the district.

* * * * *